United States Patent
Liu et al.

(10) Patent No.: US 10,950,221 B2
(45) Date of Patent: Mar. 16, 2021

(54) KEYWORD CONFIRMATION METHOD AND APPARATUS

(71) Applicant: Alibaba Group Holding Limited, Grand Cayman (KY)

(72) Inventors: Yong Liu, Beijing (CN); Haitao Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 137 days.

(21) Appl. No.: 16/213,882

(22) Filed: Dec. 7, 2018

(65) Prior Publication Data

US 2019/0180734 A1 Jun. 13, 2019

(30) Foreign Application Priority Data

Dec. 8, 2017 (CN) .......................... 201711294885.0

(51) Int. Cl.
| | | |
|---|---|---|
| *G10L 15/02* | (2006.01) | |
| *G10L 25/93* | (2013.01) | |
| *G10L 25/78* | (2013.01) | |
| G10L 15/08 | (2006.01) | |
| G10L 25/03 | (2013.01) | |

(52) U.S. Cl.
CPC .............. *G10L 15/02* (2013.01); *G10L 25/78* (2013.01); *G10L 25/93* (2013.01); G10L 25/03 (2013.01); G10L 2015/088 (2013.01)

(58) Field of Classification Search
CPC .......... G10L 15/02; G10L 25/78; G10L 25/93
See application file for complete search history.

(56) References Cited

U.S. PATENT DOCUMENTS

| | | |
|---|---|---|
| 4,393,271 A | 7/1983 | Fujinami et al. |
| 5,899,972 A | 5/1999 | Miyazawa et al. |
| 8,924,209 B2 | 12/2014 | Newman |
| 8,990,079 B1 | 3/2015 | Newman |
| 9,454,976 B2 | 9/2016 | Newman |
| 9,530,407 B2 | 12/2016 | Katuri et al. |
| 10,276,156 B2 | 4/2019 | Largey |
| 10,424,299 B2 | 9/2019 | Lawrence et al. |
| 2003/0171917 A1 | 9/2003 | Zhu et al. |

(Continued)

OTHER PUBLICATIONS

The PCT Search Report and Written Opinion dated Mar. 5, 2019 for PCT Application No. PCT/US2018/064595, 8 pages.

*Primary Examiner* — Jakieda R Jackson
(74) *Attorney, Agent, or Firm* — Lee & Hayes, P.C.

(57) ABSTRACT

A keyword confirmation method and apparatus are provided. A keyword confirmation method includes: obtaining first audio data, the first audio data being recognized as a keyword; obtaining a pronunciation similarity probability of a similar pronunciation unit corresponding to at least one fragment of the first audio data and second audio data; determining that multiple contiguous silence fragments exist in second audio data contiguous in time with the first audio data; utilizing the silence probability, as well as a pronunciation similarity probability corresponding to fragment(s) of the first audio data and/or a pronunciation similarity probability corresponding to fragment(s) of the second audio data, evaluating whether the second audio data is silence; and confirming the first audio data as an effective keyword.

19 Claims, 12 Drawing Sheets

(56) References Cited

U.S. PATENT DOCUMENTS

| | | | |
|---|---|---|---|
| 2008/0235016 A1* | 9/2008 | Paul | G06N 20/00 |
| | | | 704/246 |
| 2009/0030690 A1 | 1/2009 | Yamada | |
| 2013/0093445 A1 | 4/2013 | Newman | |
| 2014/0297287 A1 | 10/2014 | Newman | |
| 2017/0098442 A1 | 4/2017 | Hoffmeister | |
| 2018/0075843 A1* | 3/2018 | Hayakawa | G10L 15/08 |
| 2018/0308490 A1 | 10/2018 | Lim et al. | |

* cited by examiner

KEYWORD CONFIRMATION METHOD AND APPARATUS

CROSS REFERENCE TO RELATED PATENT APPLICATIONS

This application claims priority to Chinese Patent Application No. 201711294885.0, filed on Dec. 8, 2017 and entitled "KEYWORD CONFIRMATION METHOD AND APPARATUS", which is incorporated herein by reference in its entirety.

TECHNICAL FIELD

The present invention belongs to the field of computers, and particularly relates to keyword confirmation methods and apparatuses.

BACKGROUND

In the field of human-computer interactions, many kinds of electronic apparatuses such as, for example, in-vehicle terminals and the like already utilize keywords to wake up electronic apparatuses, activate human-computer interaction functions, or execute particular types of functions.

For example, when a user says "start the system," "zoom in on the map," and such specific keywords, the electronic apparatus, after detecting the above-mentioned keywords of the user, executes pertinent system start and map zoom-in functions. In such a voice-controlled fashion, convenience is greatly increased for the user.

But, a problem to be solved in the present field is how to determine keywords sounded by a user without causing misevaluations: for example, recognizing a non-keyword normal conversation as keywords, or erroneously recognizing keywords as non-keywords and declining to start up.

To solve this problem, one solution set forth in existing technologies is comparing speech sounded by a user with keywords in a keyword library, and if a match can be made, then deeming that a voice command sounded by the user is a keyword, and the electronic apparatus correspondingly executes a pertinent instruction; if a match cannot be made, then it is not a keyword, and the electronic apparatus does not execute an instruction.

But, this solution easily recognizes non-keyword content in user conversations as keywords; for example, when a user says "no need to start the system yet" or "I just want to know if the zooming in on the map function works," the keywords "start the system" and "zooming in on the map" contained in this kind of normal conversation will be recognized as keywords by the electronic apparatus, and thereby instructions are erroneously executed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Given the above-mentioned problems, an example embodiment of the present disclosure sets forth keyword confirmation methods and apparatuses to solve the problems present in the existing technology.

To solve the above-mentioned problems, an example embodiment of the present disclosure discloses a keyword confirmation method, including:

Obtaining first audio data, the first audio data being recognized as a keyword;

Determining that multiple contiguous silence fragments exist in second audio data contiguous in time with the first audio data;

Confirming the first audio data as an effective keyword.

To solve the above-mentioned problems, an example embodiment of the present disclosure discloses a keyword confirmation method, including:

Obtaining first audio data, the first audio data being recognized as a keyword;

Determining a cumulative silence probability of multiple fragments of the second audio data contiguous in time with the first audio data;

Determining a cumulative keyword probability of multiple fragments of the first audio data;

When a relationship between the cumulative silence probability and the cumulative keyword probability satisfies a second preset condition, confirming the first audio data as an effective keyword.

To solve the above-mentioned problems, an example embodiment of the present disclosure discloses an in-vehicle terminal keyword confirmation method, including:

Obtaining first audio data through an in-vehicle sound collection apparatus, the first audio data being recognized as a keyword;

Determining that multiple contiguous silence fragments exist in second audio data contiguous in time with the first audio data;

Confirming the first audio data as an effective keyword, wherein the effective keyword is operative to wake an in-vehicle terminal to execute an instruction corresponding to the keyword.

To solve the above-mentioned problems, an example embodiment of the present disclosure discloses an in-vehicle terminal keyword confirmation method, including:

Obtaining first audio data through an in-vehicle sound collection apparatus, the first audio data being recognized as a keyword;

Determining a cumulative silence probability of multiple fragments of the second audio data contiguous in time with the first audio data;

Determining a cumulative keyword probability of multiple fragments of the first audio data;

When a relationship between the cumulative silence probability and the cumulative keyword probability satisfies a second preset condition, confirming the first audio data as an effective keyword, wherein the effective keyword is operative to wake an in-vehicle terminal to execute an instruction corresponding to the keyword.

To solve the above-mentioned problems, an example embodiment of the present disclosure discloses a keyword confirmation apparatus, including:

An audio data obtaining module, configured to obtain first audio data, the first audio data being recognized as a keyword;

A silence fragment determining module, configured to determine that multiple contiguous silence fragments exist in second audio data contiguous in time with the first audio data;

An effective keyword determining module, configured to confirm the first audio data as an effective keyword.

To solve the above-mentioned problems, an example embodiment of the present disclosure discloses a keyword confirmation apparatus, including:

An audio data obtaining module, configured to obtain first audio data, the first audio data being recognized as a keyword;

A cumulative silence fragment determining module, configured to determine a cumulative silence probability of multiple fragments of the second audio data contiguous in time with the first audio data;

A cumulative keyword probability determining module, configured to determine a cumulative keyword probability of multiple fragments of the first audio data;

An effective keyword determining module, configured to confirm, when a relationship between the cumulative silence probability and the cumulative keyword probability satisfies a second preset condition, the first audio data as an effective keyword.

An example embodiment of the present disclosure further discloses a terminal device, comprising:

One or more processors; and

One or more machine-readable storage media storing instructions which, upon execution by the one or more processors, cause the terminal device to execute one or more of the above-mentioned methods.

An example embodiment of the present disclosure further discloses one or more machine-readable storage media storing instructions which, upon execution by one or more processors, cause a terminal device to execute one or more of the above-mentioned methods.

By the above-mentioned it may be known that keyword confirmation methods set forth by example embodiments of the present disclosure at least include the following advantages:

According to keyword confirmation methods set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

BRIEF DESCRIPTION OF THE DRAWINGS

In order to more clearly describe technical solutions of example embodiments of the present disclosure or of existing technology, below, drawings required in describing the example embodiments or the existing technology are introduced simply. Of course, the drawings described below are some example embodiments of the present disclosure; for persons of ordinary skill in the art, other drawings may be obtained from these drawings without the use of creative activity.

DETAILED DESCRIPTION

The following, incorporating the drawings of example embodiments of the present disclosure, clearly and completely describes technical solutions of example embodiments of the present disclosure. However, it is evident that the described example embodiments merely represent some example embodiments of the present disclosure, and not all example embodiments. All other example embodiments obtainable by persons of ordinary skill in the art based on the example embodiments of the present disclosure shall belong to the scope of the present disclosure's protection.

The present disclosure, in one respect, sets forth a keyword confirmation method, utilizing silence before and after a keyword to evaluate whether a keyword truly is an effective keyword, and at the same time with regard to the detection of silence, perform evaluation utilizing contiguous silence fragments of audio data or a cumulative silence probability of multiple fragments of audio data, improving accuracy of evaluation.

First Example Embodiment

Figure 1:
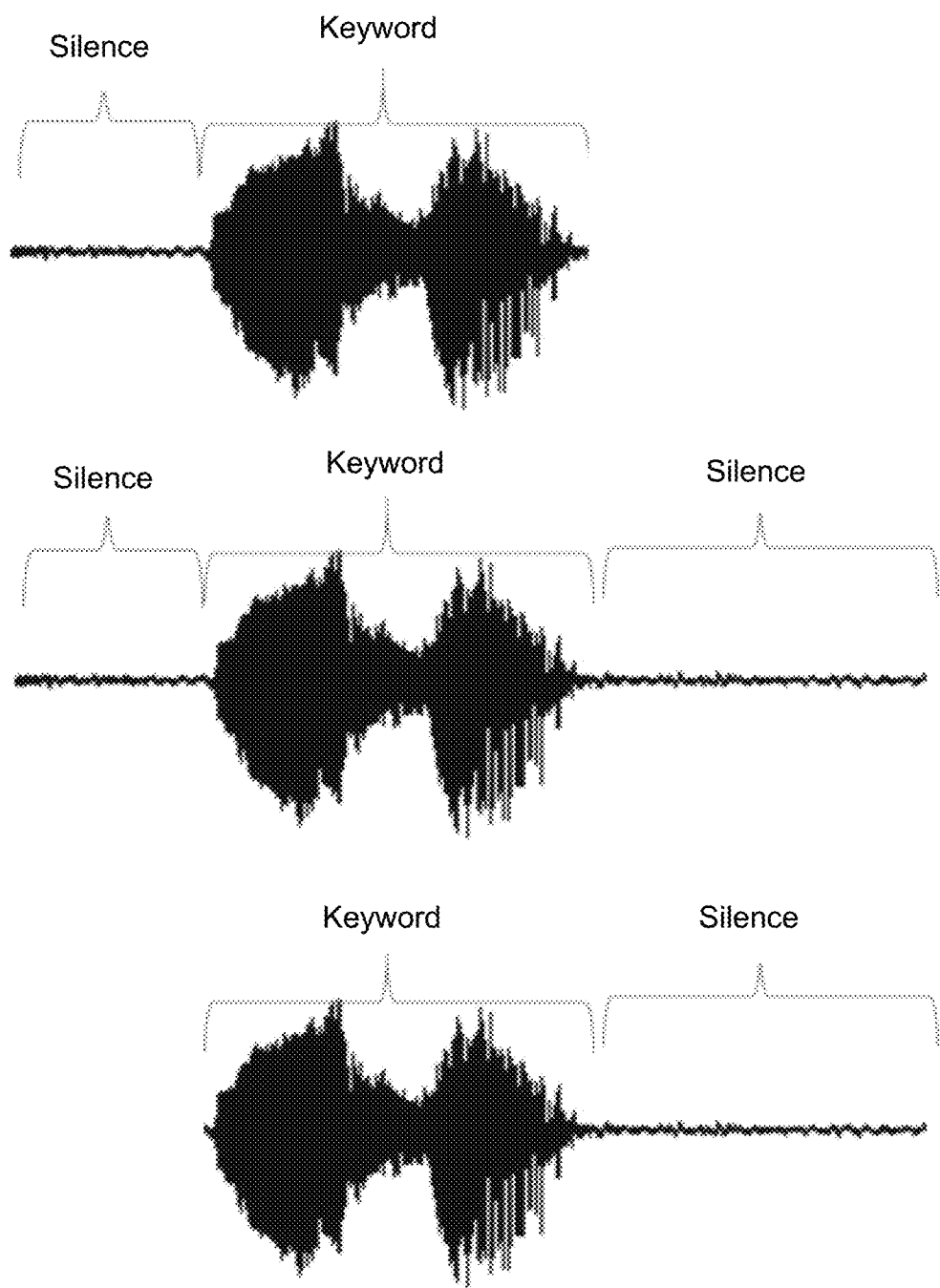
FIG. 1 illustrates a diagram of audio data before and after a normal keyword according to an example embodiment of the present disclosure.

A first example embodiment of the present disclosure sets forth a keyword confirmation method. FIG. 1 illustrates a diagram of audio data before and after a normal keyword according to an example embodiment of the present disclosure. As illustrated by FIG. 1, according to typical user habits, a pause will occur before or after sounding a keyword resulting in silence, so that silence may be picked up before or after a normal keyword. By this fashion, whether speech sounded by a user is a keyword may be evaluated.

According to FIG. 1, three possible scenarios for normal keywords respectively include: silence before a keyword, silence before and after a keyword, and silence after a keyword. Below, audio data corresponding to a keyword is designated as first audio data, and audio data corresponding to silence portions before and/or after the keyword is designated as second audio data.

Figure 2:
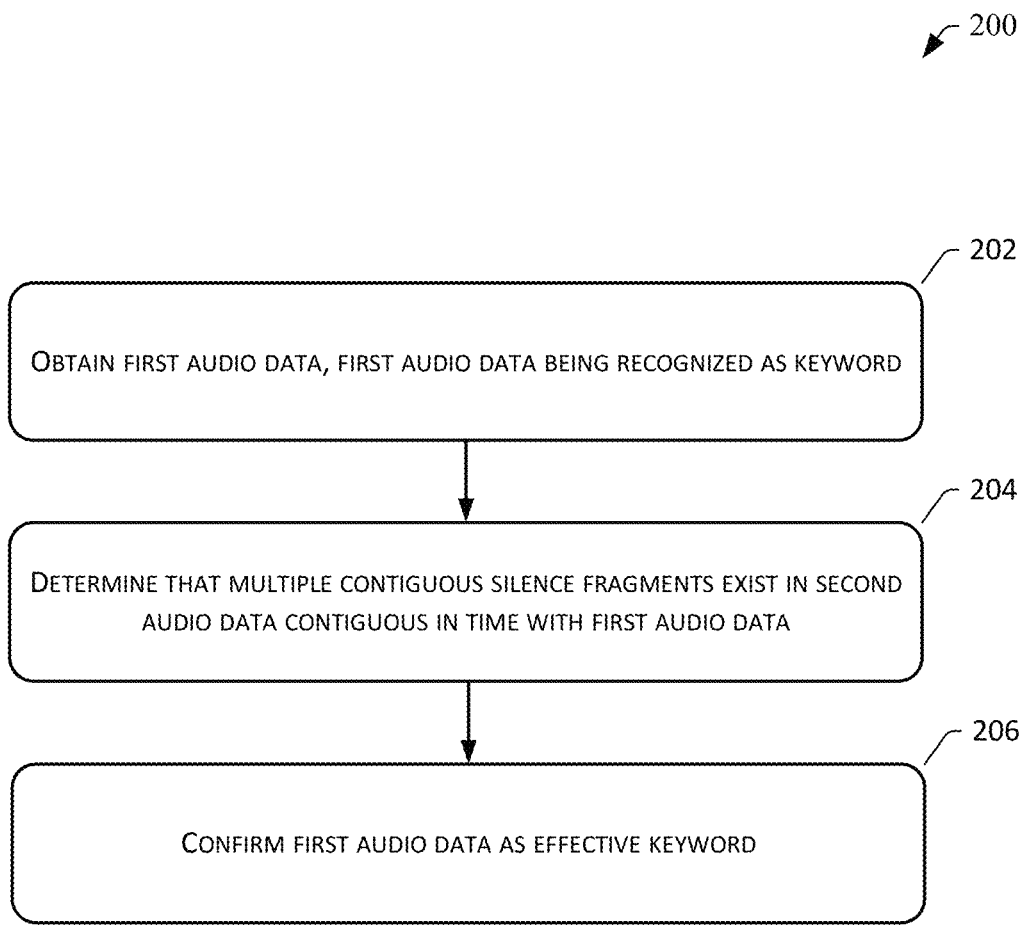
FIG. 2 is a flowchart of a keyword confirmation method according to a first example embodiment of the present disclosure.

FIG. 2 illustrates a flowchart of a keyword confirmation method 200 according to a first example embodiment of the present disclosure. As illustrated by FIG. 2, the keyword confirmation method 200 of the example embodiment of the present disclosure may include, for example, the following steps:

Step 202, obtaining first audio data, the first audio data being recognized as a keyword;

According to this step, a main executing body, such as an in-vehicle terminal, a mobile phone, a tablet computer and such electronic apparatuses, may obtain audio data, which at least includes first audio data and second audio data before/after. The second audio data and the first audio data are contiguous in time. The first audio data detected at this time is already recognized as a keyword, that is, the first audio data detected at this time has already been confirmed as matching a pre-stored keyword.

As illustrated by FIG. 1, the electronic apparatus may obtain and detect first audio data corresponding to a keyword as illustrated by FIG. 1, as well as second audio data before, after, or before and after the keyword. In actual use, a sound collection apparatus of an electronic apparatus such as a microphone may continuously collect audio, where audio data may for example be obtained in units of "frames," a frame being, for example, 10 ms. After detecting first audio data as a keyword, several frames before/after the first audio data are obtained, such as second audio data of 10 frames, to undergo subsequent analysis.

According to an example embodiment, it must be further evaluated whether the first audio data is an "effective keyword," and only after subsequently confirming as an effective keyword can a pertinent instruction be executed based on the effective keyword.

Step 204, determining that multiple contiguous silence fragments exist in second audio data contiguous in time with the first audio data;

According to this step, after inputting a fragment of the second audio data into a sound unit matching model of the electronic apparatus, similarity to a silence unit in the sound unit database may be derived, and designated as a silence probability of the fragment. For example, with regard to a fragment of the second audio data, after inputting into the sound unit matching model, its similarity to a silence unit is computed as 90%, and 90% is designated as the silence probability of the fragment. When this silence probability satisfies a certain requirement, the fragment of the second audio data is deemed to be a silence fragment.

According to an example embodiment, multiple fragments may be input into the sound unit matching model of the electronic apparatus, respectively obtaining silence probabilities of each fragment, and the silence probabilities are utilized to determine whether the fragments are silence fragments.

After evaluating the fragments as silence fragments, whether the second audio data includes multiple contiguous silence fragments therein may be evaluated. For example, with regard to multiple fragments of the second audio data, after whether each fragment is a silence fragment is derived, whether contiguous silence fragments are among these silence fragments may be detected. For example, each fragment has a label f of whether it is a silence fragment, and upon detecting that three fragments contiguous in time all have label f the second audio data is deemed to have multiple contiguous silence fragments therein.

Step 206, confirming the first audio data as an effective keyword.

According to this step, when the second audio data has multiple contiguous silence fragments therein, the second audio data is evaluated as silence, and thereby the keyword may be confirmed as an effective keyword, and subsequently a pertinent command may be executed based on the effective keyword.

For example, when the second audio data includes multiple (for example, more than three) contiguous silence fragments therein, the second audio fragment is deemed to be silence, and then the first audio data is evaluated as an effective keyword.

It should be noted that, the aforementioned and subsequently mentioned keywords may include multiple types of content: for example, a wake-up word utilized to wake up an operating system of an electronic apparatus, a voice command of a user, key parameters in a command, and the like. For example, during the procedure of voice operation of an electronic apparatus by a user, the inputs "start the system," "FM station to 87.6," "87.6" and such all belong to the category of "keywords" set forth by example embodiments of the present disclosure, not to be specially restricted by the present disclosure.

By the above-mentioned it may be known that a keyword confirmation method set forth by a first example embodiment of the present disclosure at least has the following technical results:

According to a keyword confirmation method set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

Second Example Embodiment

Figure 3:
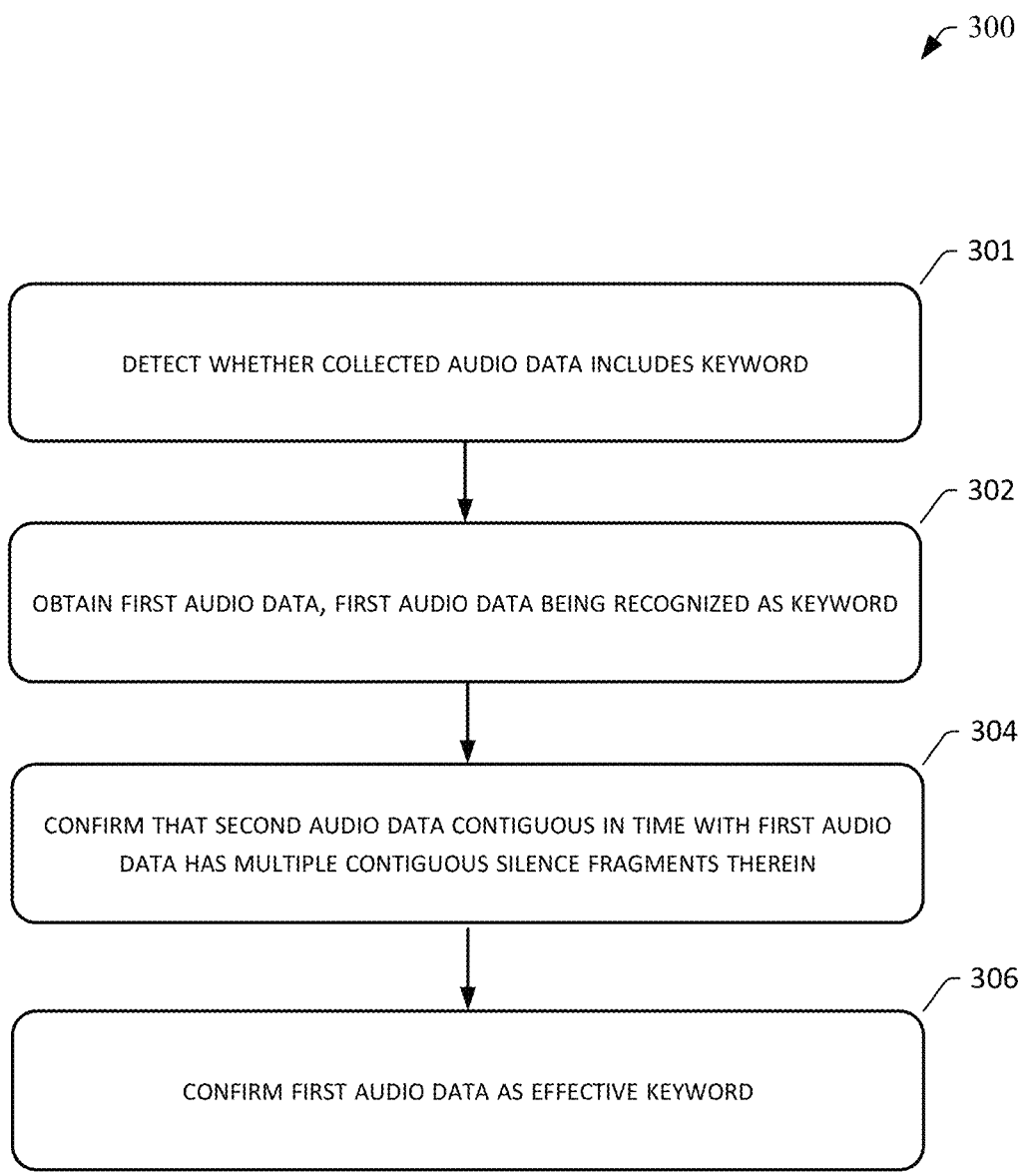
FIG. 3 is a flowchart of a keyword confirmation method according to a second example embodiment of the present disclosure.

A second example embodiment of the present disclosure sets forth a keyword confirmation method. FIG. 3 illustrates a flowchart of a keyword confirmation method 200 according to a second example embodiment of the present disclosure. As illustrated by FIG. 3, the keyword confirmation method 300 of the example embodiment of the present disclosure includes the following steps:

Step 302, obtaining first audio data, the first audio data being recognized as a keyword;

Step 304, confirming that second audio data contiguous in time with the first audio data has multiple contiguous silence fragments therein;

Step 306, confirming the first audio data as an effective keyword.

The above-mentioned step 302 through step 306 are the same as or similar to step 202 through step 206 of the above example embodiment, and shall not be detailed again herein. The present example embodiment emphasizes describing differences from the above example embodiment.

Figure 4:
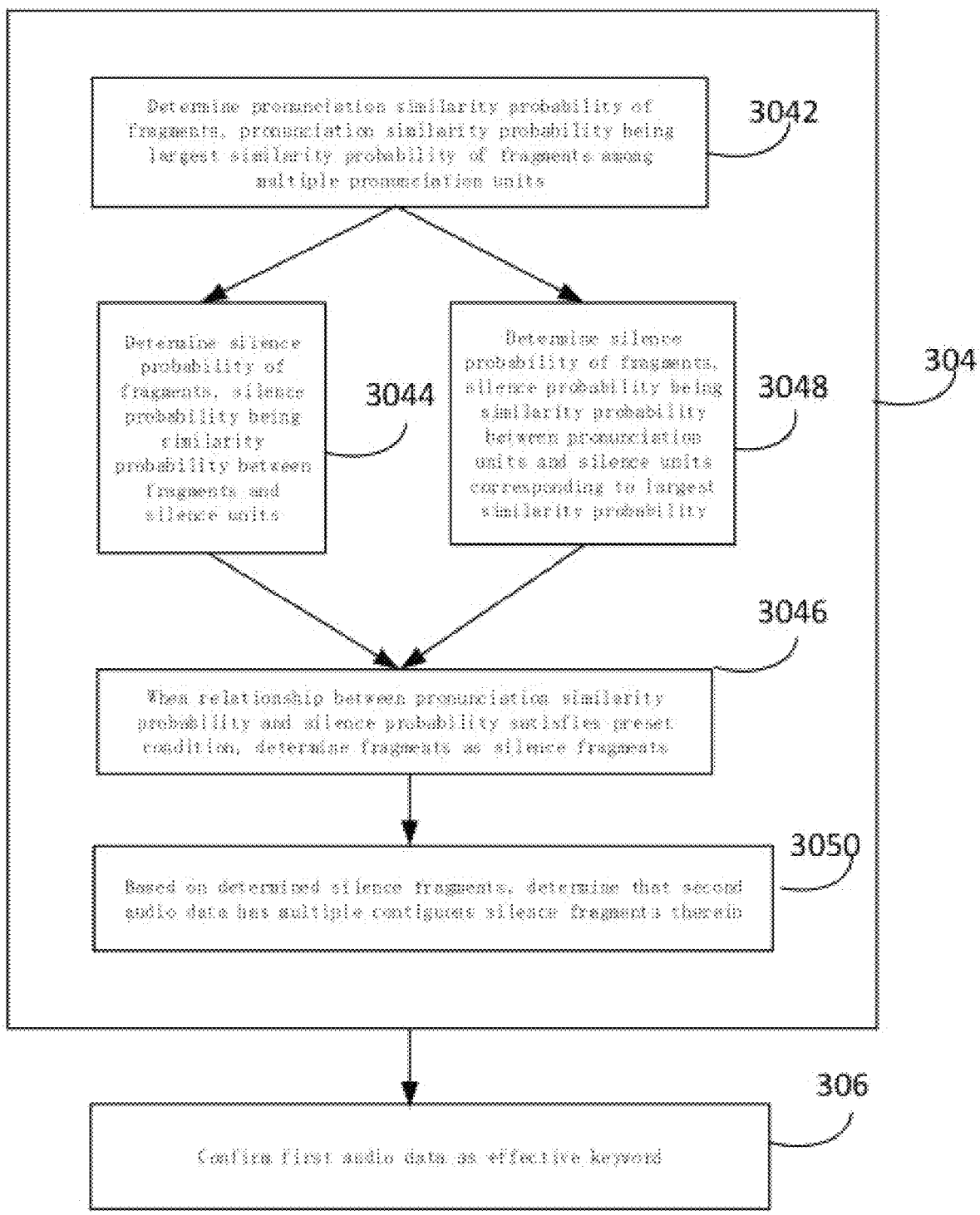
FIG. 4 is a flowchart of substeps of the steps of FIG. 3.

According to an example embodiment of a keyword confirmation method of the present disclosure, the step 304, that is, the step of confirming that second audio data contiguous in time with the first audio data has multiple contiguous silence fragments therein. may include the following substeps as illustrated by FIG. 4:

Substep 3042, determining a pronunciation similarity probability of the fragments, the pronunciation similarity probability being the largest similarity probability of the fragments among multiple pronunciation units;

According to this step, fragments of the second audio data may, for example, be audio frames as mentioned above, or may be fragments in other units, not to be limited herein; as long as the fragments are obtained by partitioning audio data according to specific principles such as time, storage method and the like, they shall belong to the scope of the present disclosure's protection. For example, the fragments may be audio frames of 10 ms or 20 ms per frame, or may be audio passages of 1 s, and the like.

A pronunciation unit may be a phoneme, syllable, character, word and such unit obtained based on partitioning pronunciation of a user. For example, when a user sounds "BanMa," a pronunciation unit is partitioned in units of phonemes, a phoneme being a pronunciation unit smaller than a syllable; from existing phoneme sets it may be known that phonemes corresponding to "BanMa" are "b a_h nn_h m a_l a_l." When pronunciation units are partitioned in units of syllables, syllables corresponding to "BanMa" are "b an m a"; when pronunciation units are partitioned in units of character pronunciation, a manner of partitioning corresponding to "BanMa" is "ban ma"; when pronunciation units are partitioned in units of words, a manner of partitioning corresponding to "BanMa" is "banma."

With regard to each manner of partitioning, a corresponding sound unit database may be constructed. A word database, aside from containing the above-mentioned pronunciation units, may also include silence units and the like. When a fragment of the second audio data has a highest similarity probability with a pronunciation unit among those pre-stored in the sound unit database, the fragment is deemed to match the pronunciation unit, and the pronunciation unit is designated as a similar pronunciation unit, while the similarity probability of the fragment and the similar pronunciation unit is designated as a pronunciation similarity probability.

With regard to a fragment of the second audio data, the fragment is input into a sound unit matching model of the electronic apparatus to undergo evaluation, and if the fragment has a highest degree of similarity, 80%, with a fifth pronunciation unit in the sound unit database and has a second highest degree of similarity, 70%, with a sixth pronunciation unit, the fifth pronunciation unit having degree of similarity of 80% may be recorded as a similar pronunciation unit corresponding to the fragment, and the pronunciation similarity probability of 80% may be recorded, for subsequent processing.

Substep 3044, determining a silence probability of the fragments, the silence probability being a similarity probability between fragments and silence units;

According to this step, after a fragment of the second audio data is input into a sound unit matching model of the electronic apparatus, similarity to a silence unit in the sound unit database may be derived, and designated as a silence probability of the fragment. For example, with regard to a fragment of the second audio data, after inputting into the sound unit matching model, its similarity to a silence unit is computed as 90%, and 90% is designated as the silence probability of the fragment.

It should be noted that the above-mentioned silence unit may be pre-stored in the sound unit database, and may be obtained through iteratively training a model using large quantities of data, such as obtaining the silence unit by comprehensively considering the loudness of a sound, environmental noise (including wind, music, car horns, and such) and the like, without limitation to absolute silence. The length, properties and such of silence units may correspond to pronunciation units. For example, when sound units are partitioned according to phonemes, silence units may be silence phonemes; when sound units are partitioned according to syllables, silence units may be silence syllables, not to be limited herein.

Substep 3046, when a relationship between the pronunciation similarity probability and the silence probability satisfies a preset condition, determining the fragments as silence fragments.

The preset condition, for example, includes:

The absolute value of a difference between the pronunciation similarity probability and the silence probability being less than a first threshold.

According to this step, the previously obtained pronunciation similarity probability corresponding to a fragment of the second audio data and the corresponding silence probability may be utilized to evaluate whether the fragment of the second audio data is silence.

By the above-mentioned it may be known that according to solutions set forth by example embodiments of the present disclosure, the evaluation of silence probability does not compare fragments of audio data to absolute silence, but rather compares pronunciation similarity probability and corresponding silence probability, comprehensively considering environmental noise and such factors, and thereby solutions provided by the present disclosure may avoid rejecting correct keywords due to inaccurate evaluation of silence.

There are various methods to utilize pronunciation similarity probability and the silence probability to evaluate whether a fragment of audio data is silence; examples are introduced herein.

For example, a fragment satisfying the requirement of "the absolute value of the difference between pronunciation similarity probability p max(indexframe) and the silence probability psil(indexframe) is less than 15%," that is:

$$|p\ \text{max}(\text{indexframe}) - p\text{sil}(\text{indexframe})| < 15\%$$

causes the fragment to be identified as a silence fragment.

According to an example embodiment of a keyword confirmation method of the present disclosure, in the above-mentioned substep 3044, evaluation of silence probability may also utilize a similarity probability between a pronunciation unit and a silence unit corresponding to the largest similarity probability for evaluation. That is, substep 3044 may be replaced with the following substep:

Substep 3048: determining a silence probability of the fragments, the silence probability being a similarity probability between pronunciation units and silence units corresponding to the largest similarity probability.

In substep 3042, the pronunciation similarity probability of the fragments was already determined; for example, in the aforementioned example, from the fragments of the second audio data undergoing evaluation through a sound unit matching model of the electronic apparatus, it is derived that the fragment has a highest degree of similarity, 80%, with a fifth pronunciation unit in the sound unit database, and the fifth pronunciation unit corresponding to the largest similarity probability of 80% is designated as a similar pronunciation unit. According to this substep, a similarity probability between the fifth pronunciation unit and a silence unit may be computed, and designated as a silence probability of the fragment.

Based on the methods listed above and technical skills of persons skilled in the art, persons skilled in the art may utilize the pronunciation similarity probability and silence probability to establish yet more evaluation methods, to evaluate whether the fragments of the second audio data are silence, without any particular limitation by the present disclosure.

After substep 3046 or substep 3048, that is, after determining the fragments as silence fragments, the step 304, that is, the step of determining that the second audio data contiguous in time with the first audio data has multiple contiguous silence fragments therein may further include the following substep:

Substep 3050, based on the determined silence fragments, determining that the second audio data has multiple contiguous silence fragments therein.

According to this step, whether the second audio data includes multiple contiguous silence fragments may be evaluated. For example, with regard to multiple fragments of the second audio data, for example, with regard to the label f given to each fragment established as a silence fragment in substeps 3046 or 3048, upon detecting that three fragments contiguous in time have the silence label f the second audio data is deemed to have multiple contiguous silence fragments therein.

According to an example embodiment of a keyword confirmation method of the present disclosure, according to the above-mentioned substep 3050, that is, the step of determining that the second audio data has multiple contiguous silence fragments therein, "multiple" as mentioned above may mean more than three; that is, substep 3050 may be:

Determining that the second audio data has more than three contiguous silence fragments therein.

Thereby step 306 may be:

When more than three contiguous silence fragment contiguous in time exist, confirming the first audio data as an effective keyword.

According to an example embodiment of a keyword confirmation method of the present disclosure, before the step 302, that is, the step of obtaining audio data, the method may further include:

Step 301, detecting whether collected audio data includes a keyword.

According to this step, multiple keywords may be pre-stored in a keyword database of an electronic apparatus, such as "hello BanMa," "start the system," "zoom in on the map," "zoom out on the map," "exit navigation," and the like. A keyword in the first audio data may be any among these, and utilizing a keyword database, similarity probabilities between the input first audio data and these keywords may be computed, and a word having the highest probability and probability higher than a set threshold is selected and designated as a detected keyword. In the step 302, that is, the step of obtaining first audio data, the first audio data may be obtained from collected audio data determined as including a keyword.

In particular, for example a sound unit matching method of the present disclosure may be utilized, partitioning the audio data into multiple fragments. When a fragment has a highest similarity probability with a pronunciation unit pre-stored in the sound unit database, the fragment and the pronunciation unit are deemed to match, and the pronunciation unit is designated as a similar pronunciation unit, while the degree of similarity between the fragment and the similar pronunciation unit is designated as a pronunciation similarity probability.

With regard to typical speech, such as first audio data, pronunciation similarity probabilities of multiple fragments may be processed, such as by multiplication, to obtain a maximum probability path, and designate the word corresponding to the path as a matching keyword.

According to an example embodiment of a keyword confirmation method of the present disclosure, the keyword has attribute information, and the step 306, the step of confirming the first audio data as an effective keyword may include:

When attribute information of the keyword is a primary keyword, and second audio data before the keyword is silence, confirming the keyword as an effective primary keyword.

According to example embodiments of the present disclosure, each keyword may correspond to an attribute information, the information recording whether the keyword is a primary keyword or a secondary keyword. The keyword database of the electronic apparatus pre-stores multiple keywords therein, which may be categorized as, for example, primary keywords and secondary keywords, such as "hello BanMa," "start the system," and the like being established as primary keywords, and "zoom in on the map," "zoom out on the map," "exit navigation" and the like being established as secondary keywords.

With regard to primary keywords, taking into consideration that primary keywords may have no trailing content, speech may be recognized directly; for example, in "Hello BanMa please help me look up the way to Zhongguancun," if audio data before a keyword can be established as silence, and attribute information of the keyword is a primary keyword, then this keyword is confirmed as a primary keyword; whether there is silence after the keyword is not detected.

According to an example embodiment of a keyword confirmation method of the present disclosure, the keyword has attribute information, and the step 306, the step of confirming the first audio data as an effective keyword may include:

When attribute information of the keyword is a secondary keyword, and second audio data before and after the keyword is silence, confirming the keyword as an effective secondary keyword.

According to this step, a secondary keyword may be a command that a user requests an electronic apparatus to execute directly, such as "zoom in on the map." When content before and after the keyword can be established as silence, and an attribute of the keyword is a secondary keyword, then the keyword is confirmed as a secondary keyword. When a user says "I just want to try if zooming in on the map works" or "I don't know I can zoom in on the map" or "just zooming in on the map is fine" and such speech, although a keyword may be detected, the condition of silence before and after is not satisfied, and it will not be evaluated as an effective keyword.

Summarizing the above, the keyword confirmation method set forth by the present example embodiment at least includes the following advantages:

According to an optional example embodiment of a keyword confirmation method set forth by the present disclosure, an advantageous evaluation method is set forth, utilizing a ratio of the cumulative silence probability of the second audio data and a cumulative keyword probability of the first audio data and/or a difference between a pronunciation similarity probability and a silence probability of the second audio data to evaluate whether the second audio data is silence, causing evaluation results to be more accurate; additionally, with regard to different types of keywords— primary keywords and secondary keywords, different further confirmation methods are established, causing evaluation results to be more reliable.

Third Example Embodiment

Figure 5:
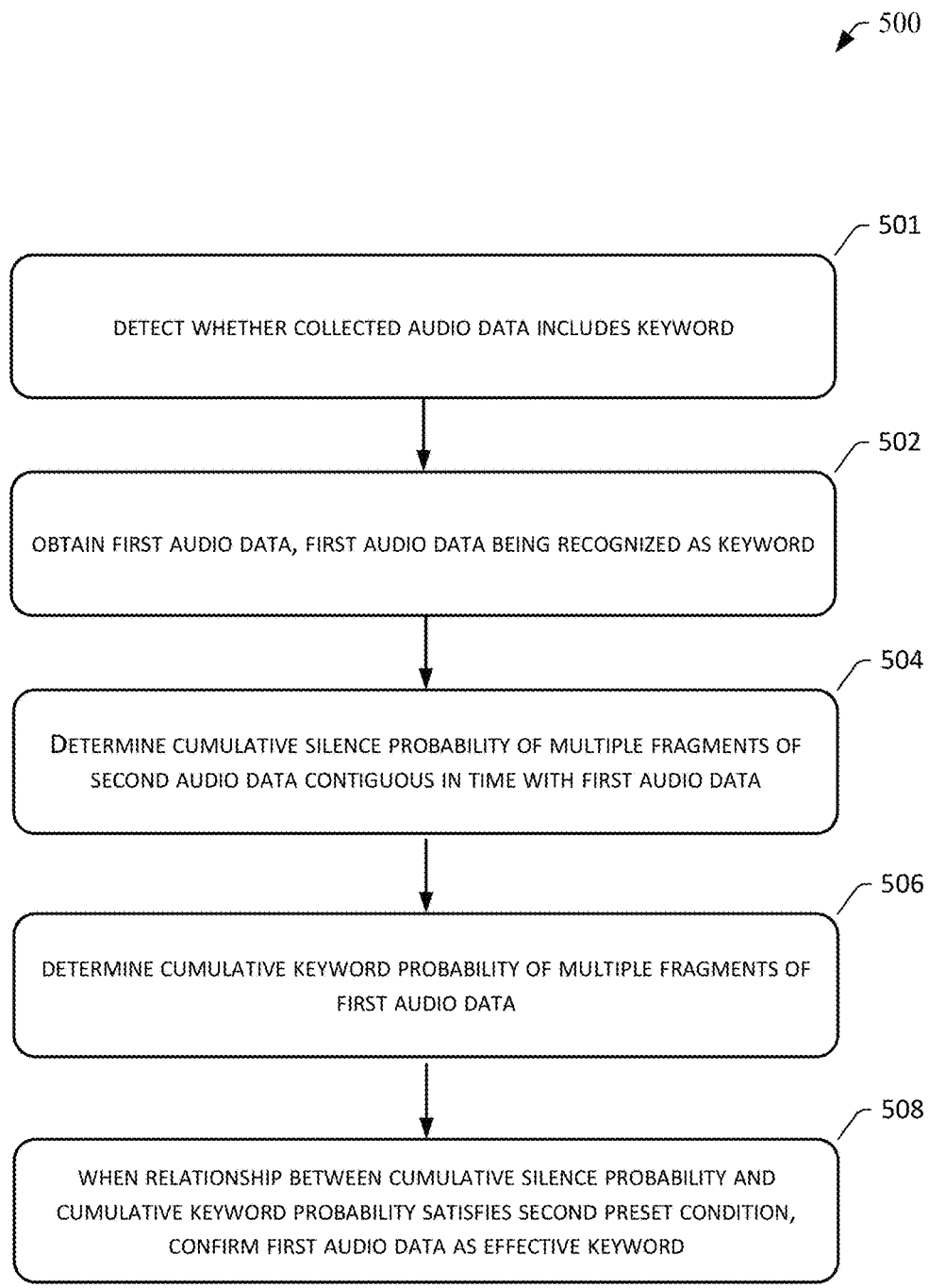
FIG. 5 is a flowchart of a keyword confirmation method according to a third example embodiment of the present disclosure.

A third example embodiment of the present disclosure sets forth a keyword confirmation method. FIG. 5 illustrates a flowchart of a keyword confirmation method 500 according to a third example embodiment of the present disclosure. As illustrated by FIG. 5, the keyword confirmation method 500 of the example embodiment of the present disclosure has the following steps:

Step 502, obtaining first audio data, the first audio data being recognized as a keyword;

According to this step, an executing body, such as an in-vehicle terminal, a mobile phone, a tablet computer and such electronic apparatuses, may obtain audio data, which at least includes first audio data and second audio data before/after. The second audio data and the first audio data are contiguous in time. The first audio data detected at this time is already recognized as a keyword, that is, the first audio data detected at this time has already been confirmed as matching a pre-stored keyword.

The electronic apparatus may obtain and detect first audio data corresponding to a keyword, as well as second audio data before, after, or before and after the keyword. In actual use, a sound collection apparatus of an electronic apparatus such as a microphone may continuously collect audio, where audio data may for example be obtained in units of "frames," a frame being, for example, 10 ms. After detecting first audio data as a keyword, several frames before/after the first audio data are obtained, such as second audio data of 10 frames, to undergo subsequent analysis.

Step 504, determining a cumulative silence probability of multiple fragments of the second audio data contiguous in time with the first audio data;

A cumulative silence probability p(sil) of multiple fragments of the second audio data may be obtained utilizing a product or sum of silence probabilities of each fragment of the second audio data. A silence probability of each fragment may be computed through methods provided by the aforementioned first and second example embodiments; according to step 504, the cumulative silence probability may be obtained through methods of adding or multiplying these silence probabilities.

Step 506, determining a cumulative keyword probability of multiple fragments of the first audio data;

According to this step, a cumulative keyword probability p(kws) of the first audio data may be a product of pronunciation similarity probabilities corresponding to multiple fragments of the first audio data. For example, with regard to a first fragment and a second fragment of the first audio data, these two fragments are input into a sound unit matching model of the electronic apparatus to undergo evaluation. If the first fragment has a highest degree of similarity, 90%, with a first pronunciation unit and has a second highest degree of similarity, 80%, with a second pronunciation unit, the first pronunciation unit is designated as a similar pronunciation unit of the first fragment, and 90% is designated as a pronunciation similarity probability of the first fragment; supposing that a pronunciation similarity probability of the second fragment is 70%, the cumulative keyword probability of the first audio data is 90%×70%.

It should be noted that the cumulative keyword probability p(kws) of the first audio data may be obtained from prior processing, and is not limited to being obtained from immediate computation. The present disclosure does not limit the obtaining method.

Step 508, when a relationship between the cumulative silence probability and the cumulative keyword probability satisfies a second preset condition, confirming the first audio data as an effective keyword.

According to an example embodiment of a keyword confirmation method of the present disclosure, the second preset condition includes:

A ratio of the cumulative silence probability and the cumulative keyword probability being greater than a second threshold.

According to this example embodiment, by way of example, the greater the ratio of p(sil)/p(kws), the more accurate the evaluation of the second audio data as silence. Thereby the second preset condition may be established as including a ratio of the cumulative silence probability and the cumulative keyword probability being greater than the second threshold, and when p(sil)/p(kws) is greater than the second threshold (such as 1.5) the second audio data is deemed to be silence.

According to an optional example embodiment of the present disclosure, before the step 502, that is, the step of obtaining audio data, the method further includes:

Step 501, detecting whether collected audio data includes a keyword.

According to this step, multiple keywords may be pre-stored in a keyword database of an electronic apparatus, such as "hello BanMa," "start the system," "zoom in on the map," "zoom out on the map," "exit navigation," and the like. A keyword in first audio data may be any among these, and utilizing a keyword database, similarity probabilities between the input first audio data and these keywords may be computed, and a word having the highest probability and probability higher than a set threshold is selected and designated as a detected keyword. In the step 502, that is, the step of obtaining first audio data, the first audio data may be obtained from collected audio data determined as including a keyword.

In particular, for example a sound unit matching method of the present disclosure may be utilized, partitioning the audio data into multiple fragments, and when a fragment has a highest similarity probability with a pronunciation unit pre-stored in the sound unit database, the fragment and the pronunciation unit are deemed to match, and the pronunciation unit is designated as a similar pronunciation unit, while the degree of similarity between the fragment and the similar pronunciation unit is designated as a pronunciation similarity probability.

With regard to typical speech, such as first audio data, pronunciation similarity probabilities of multiple fragments may be processed, such as by multiplication, to obtain a maximum probability path, and designate the word corresponding to the path as a matching keyword.

According to an example embodiment of a keyword confirmation method of the present disclosure, the keyword has attribute information, and when a relationship between the cumulative silence probability and the cumulative keyword probability satisfies the second preset condition, the step of confirming the first audio data as an effective keyword may include:

When attribute information of the keyword is a primary keyword, and second audio data before the keyword is silence, confirming the keyword as an effective primary keyword.

According to example embodiments of the present disclosure, each keyword may correspond to an attribute information, the information recording whether the keyword is a primary keyword or a secondary keyword. The keyword database of the electronic apparatus pre-stores multiple keywords therein, which may be categorized as, for example, primary keywords and secondary keywords, such as "hello BanMa," "start the system," and the like being established as primary keywords, and "zoom in on the map," "zoom out on the map," "exit navigation" and the like being established as secondary keywords.

With regard to primary keywords, taking into consideration that primary keywords may have no trailing content, speech may be recognized directly; for example, in "Hello BanMa please help me look up the way to Zhongguancun," if audio data before a keyword can be established as silence, and attribute information of the keyword is a primary keyword, then this keyword is confirmed as a primary keyword; whether there is silence after the keyword is not detected.

According to an example embodiment of a keyword confirmation method of the present disclosure, the keyword has attribute information, and when the relationship between the cumulative silence probability and the cumulative keyword probability satisfies the second preset condition, the step of confirming the first audio data as an effective keyword may include:

When attribute information of the keyword is a secondary keyword, and second audio data before and after the keyword is silence, confirming the keyword as an effective secondary keyword.

According to this step, a secondary keyword may be a command that a user requests an electronic apparatus to execute directly, such as "zoom in on the map." When content before and after the keyword can be established as silence, and an attribute of the keyword is a secondary keyword, then the keyword is confirmed as a secondary keyword. When a user says "I just want to try if zooming in on the map works" or "I don't know I can zoom in on the map" or "just zooming in on the map is fine" and such speech, although a keyword may be detected, the condition of silence before and after is not satisfied, and it will not be evaluated as an effective keyword.

Summarizing the above, the keyword confirmation method set forth by the present example embodiment at least includes the following advantages:

According to a keyword confirmation method set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

Otherwise, the keyword confirmation method set forth by the present example embodiment at least further includes the following advantages:

According to an optional example embodiment of a keyword confirmation method set forth by the present disclosure, an advantageous evaluation method is set forth, utilizing a ratio of the cumulative silence probability of the second audio data and a cumulative keyword probability of the first audio data and/or a difference between a pronunciation similarity probability and a silence probability of the second audio data to evaluate whether the second audio data is silence, causing evaluation results to be more accurate; additionally, with regard to different types of keywords—primary keywords and secondary keywords, different further confirmation methods are established, causing evaluation results to be more reliable.

Fourth Example Embodiment

Figure 6:
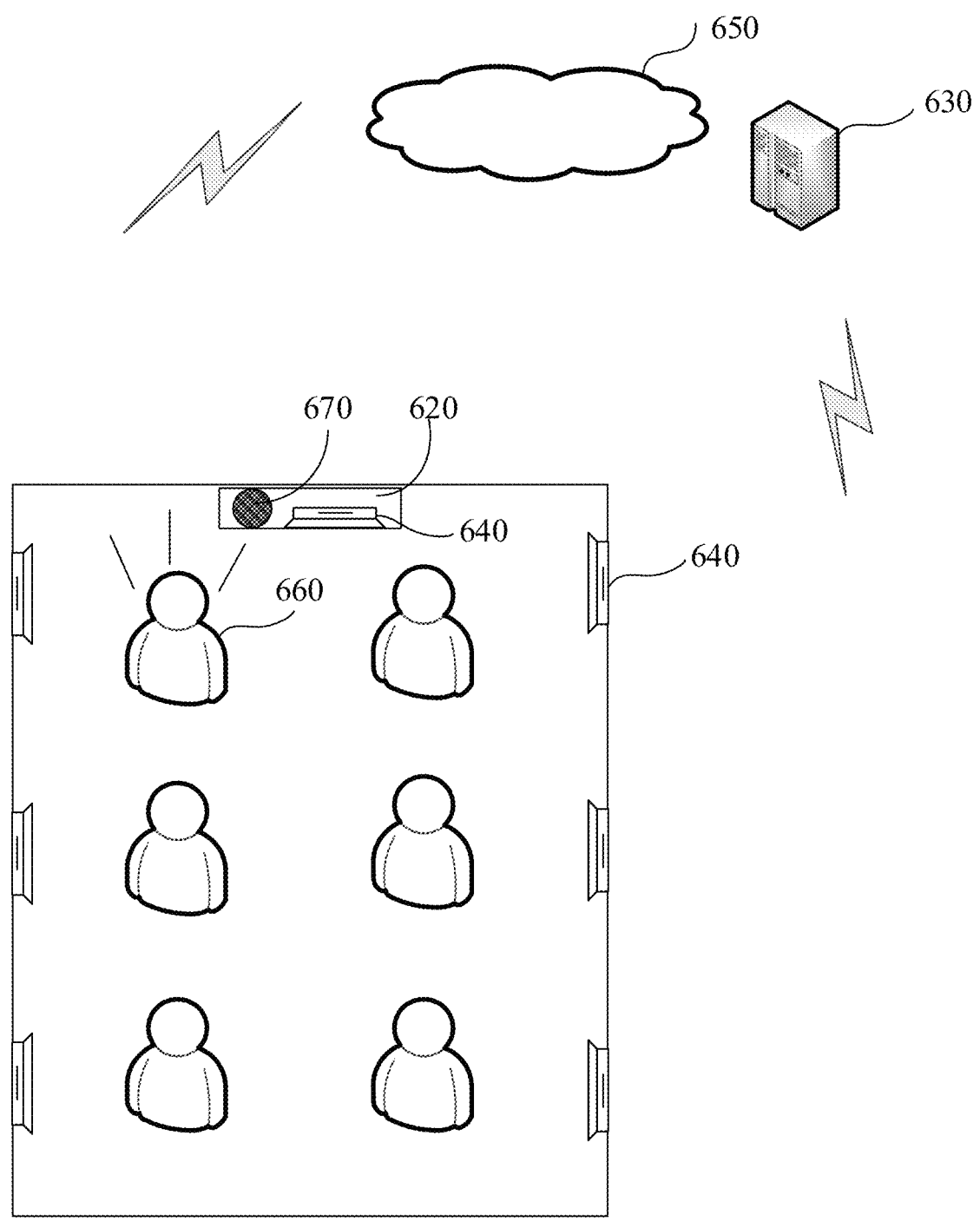
FIG. 6 is a diagram of an in-vehicle terminal including a vehicle environment.

A fourth example embodiment of the present disclosure sets forth an in-vehicle terminal keyword confirmation method. FIG. 6 is a diagram of an in-vehicle terminal including a vehicle environment. As illustrated by FIG. 6, the vehicle includes an in-vehicle terminal 620 set up in the vehicle interior, and the in-vehicle terminal includes speakers 640 and a microphone 670, and may further include a screen, buttons and the like (not illustrated). The speakers 640 may be integrated in the in-vehicle terminal 620, or may be set up in other positions in the vehicle interior, supplying audible information to passengers 660. The in-vehicle terminal 620 has computational processing functionality, may have an operation system and application programs installed, and may, through the Internet 650, remotely network with a server 630 and exchange data.

Figure 7:
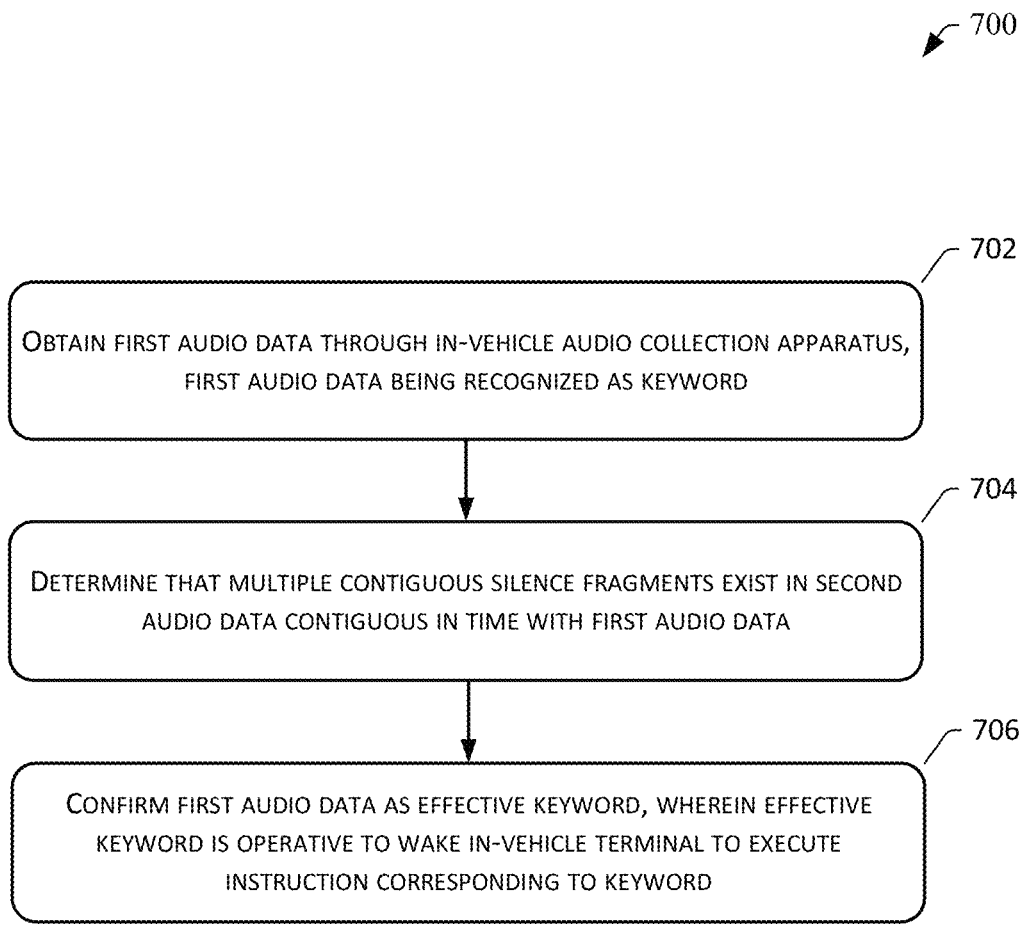
FIG. 7 is a flowchart of an in-vehicle terminal keyword confirmation method according to a fifth example embodiment of the present disclosure.

As illustrated by FIG. 7, an in-vehicle terminal keyword confirmation method 700 of an example embodiment of the present disclosure has the following steps:

Step 702, obtaining first audio data through an in-vehicle sound collection apparatus, the first audio data being recognized as a keyword;

According to this step, the in-vehicle terminal 620 may obtain audio data, which at least includes first audio data and second audio data before/after. The second audio data and the first audio data are contiguous in time. First audio data detected at this time is already recognized as a keyword, that is, the audio data detected by the microphone 670 at this time is already confirmed as matching a pre-stored keyword.

As illustrated by FIG. 1, the in-vehicle terminal 620 may obtain and detect first audio data corresponding to a keyword as illustrated by FIG. 1, as well as second audio data before, after, or before and after the keyword. In actual use, a sound collection apparatus of an in-vehicle terminal 620 such as a microphone may continuously collect audio, where audio data may for example be obtained in units of "frames," a frame being, for example, 10 ms. After detecting first audio data as a keyword, several frames before/after the first audio data are obtained, such as second audio data of 10 frames, to undergo subsequent analysis.

Step 704, determining that multiple contiguous silence fragments exist in second audio data contiguous in time with the first audio data;

According to this step, after inputting a fragment of the second audio data into a sound unit matching model of the in-vehicle terminal 620, similarity to silence units in the sound unit database may be derived, and designated as a silence probability of the fragment. For example, with regard to a fragment of the second audio data, after inputting into the sound unit matching model, its similarity to a silence unit is computed as 90%, and 90% is designated as the silence probability of the fragment. When this silence probability satisfies a certain requirement, the fragment of the second audio data is deemed to be a silence fragment.

According to an example embodiment, multiple fragments may be input into the sound unit matching model of the in-vehicle terminal 620, respectively obtaining silence probabilities of each fragment, and the silence probabilities are utilized to determine whether the fragments are silence fragments.

Step 706, confirming the first audio data as an effective keyword, wherein the effective keyword is operative to wake an in-vehicle terminal to execute an instruction corresponding to the keyword.

According to this step, when the second audio data has multiple contiguous silence fragments therein, the second audio data is evaluated as silence, and thereby the keyword may be confirmed as an effective keyword, and subsequently a pertinent command may be executed based on the effective keyword.

For example, with regard to multiple fragments of the second audio data, by the aforementioned, whether each fragment is a silence fragment is already derived. According to this step, whether contiguous silence fragments exist among these silence fragments may be detected, and when multiple (for example, more than three) contiguous silence fragments are included therein, the second audio fragment is deemed to be silence, and then the first audio data is evaluated as an effective keyword, wherein the effective keyword is operative to wake an in-vehicle terminal to execute an instruction corresponding to the keyword.

Otherwise, the in-vehicle terminal keyword confirmation method set forth by the present example embodiment at least has the following advantages:

According to an in-vehicle keyword confirmation method set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

Fifth Example Embodiment

Figure 8:
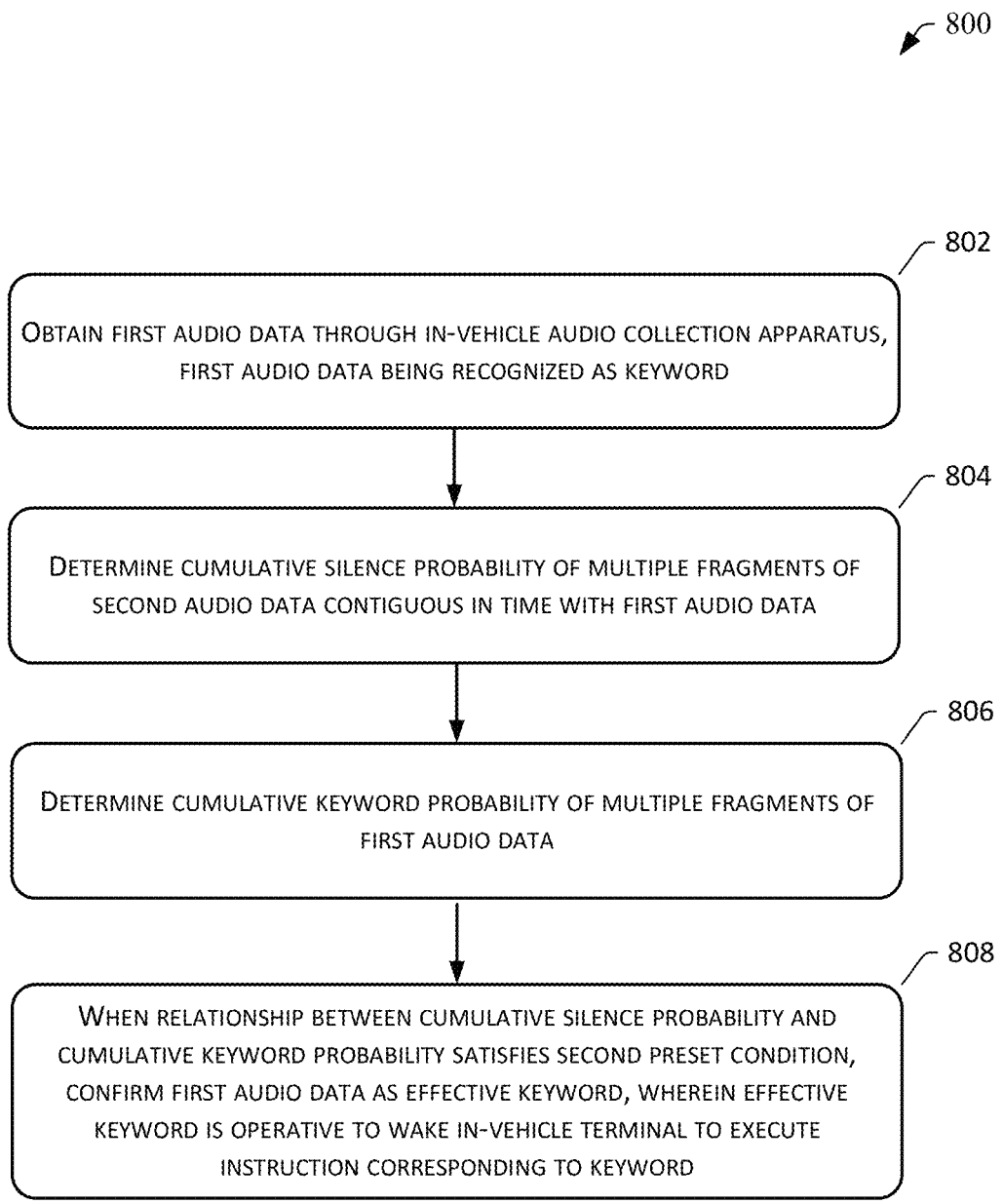
FIG. 8 is a flowchart of an in-vehicle terminal keyword confirmation method according to a sixth example embodiment of the present disclosure.

A fifth example embodiment of the present disclosure sets forth an in-vehicle terminal keyword confirmation method. FIG. 8 is a flowchart of an in-vehicle terminal keyword confirmation method 800 according to a sixth example embodiment of the present disclosure. As illustrated by FIG. 8, an in-vehicle terminal keyword confirmation method according to an example embodiment of the present disclosure has the following steps:

Step 802, obtaining first audio data through an in-vehicle sound collection apparatus, the first audio data being recognized as a keyword;

According to this step, the in-vehicle terminal may obtain audio data, which at least includes first audio data and second audio data before/after. The second audio data and the first audio data are contiguous in time. First audio data detected at this time is already recognized as a keyword, that is, the audio data detected at this time is already confirmed as matching a pre-stored keyword.

The in-vehicle terminal may obtain and detect first audio data corresponding to a keyword, as well as second audio data before, after, or before and after the keyword. In actual use, a sound collection apparatus of an in-vehicle terminal such as a microphone may continuously collect audio, where audio data may for example be obtained in units of "frames," a frame being, for example, 10 ms. After detecting first audio data as a keyword, several frames before/after the first audio data are obtained, such as second audio data of 10 frames, to undergo subsequent analysis.

Step 804, determining a cumulative silence probability of multiple fragments of the second audio data contiguous in time with the first audio data;

A cumulative silence probability p(sil) of multiple fragments of the second audio data may be obtained utilizing a product or sum of silence probabilities of each fragment of the second audio data. A silence probability of each fragment may be computed through methods provided by the aforementioned first and second example embodiments; according to step 504, the cumulative silence probability may be obtained through methods of adding or multiplying these silence probabilities.

Step 806, determining a cumulative keyword probability of multiple fragments of the first audio data;

According to this step, a cumulative keyword probability p(kws) of the first audio data may be a product of pronunciation similarity probabilities corresponding to multiple fragments of the first audio data. For example, with regard to a first fragment and a second fragment of the first audio data, these two fragments are input into a sound unit matching model of the in-vehicle terminal to undergo evaluation. If the first fragment has a highest degree of similarity, 90%, with a first pronunciation unit and has a second highest degree of similarity, 80%, with a second pronunciation unit, the first pronunciation unit is designated as a similar pronunciation unit of the first fragment, and 90% is designated as a pronunciation similarity probability of the first fragment; supposing that a pronunciation similarity probability of the second fragment is 70%, the cumulative keyword probability of the first audio data is 90%×70%.

Step 808, when a relationship between the cumulative silence probability and the cumulative keyword probability satisfies a second preset condition, confirming the first audio data as an effective keyword, wherein the effective keyword is operative to wake an in-vehicle terminal to execute an instruction corresponding to the keyword.

According to this example embodiment, by way of example, the greater the ratio of p(sil)/p(kws), the more accurate the evaluation of the second audio data as silence. Thereby the second preset condition may be established as including a ratio of the cumulative silence probability and the cumulative keyword probability being greater than the second threshold, and when p(sil)/p(kws) is greater than the second threshold (such as 1.5) the second audio data is deemed to be silence.

According to an example embodiment of a keyword confirmation method of the present disclosure, the second preset condition includes:

A ratio of the cumulative silence probability and the cumulative keyword probability being greater than a second threshold.

Otherwise, the in-vehicle terminal keyword confirmation method set forth by the present example embodiment at least has the following advantages:

According to an in-vehicle keyword confirmation method set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

It should be noted that although the above-mentioned fourth and fifth example embodiments set forth in-vehicle terminal keyword confirmation methods, it will be clear to persons skilled in the art that keyword confirmation methods of the present disclosure are not limited to in-vehicle terminals, but may also be applied to other various smart devices: for example, mobile phones, servers, smart appliances and such various smart devices having computational, processing functionality. Smart appliances include, for example, microwaves, ovens, washing machines, dishwashers, air conditioners, routers, smart speakers, televisions, refrigerators, vacuum cleaners and the like.

According to an example embodiment, when the above-mentioned keyword confirmation method is applied to a smart speaker, the above-mentioned keywords may include "play music," "next song," and the like. When a smart speaker, through a sound collection apparatus, receives the keyword "play music" (first audio data), the smart speaker, through evaluating whether second audio data is silence, then confirms the keyword as an effective keyword. According to an example embodiment, after confirmation as an effective keyword, the smart speaker may start to execute an instruction to play music corresponding to the effective keyword.

The above example embodiment is described with a smart speaker as an example, but it will be clear to persons skilled in the art that keyword confirmation methods provided by the present disclosure may be applied to various types of smart devices, which shall not be limited herein.

Sixth Example Embodiment

Figure 9:
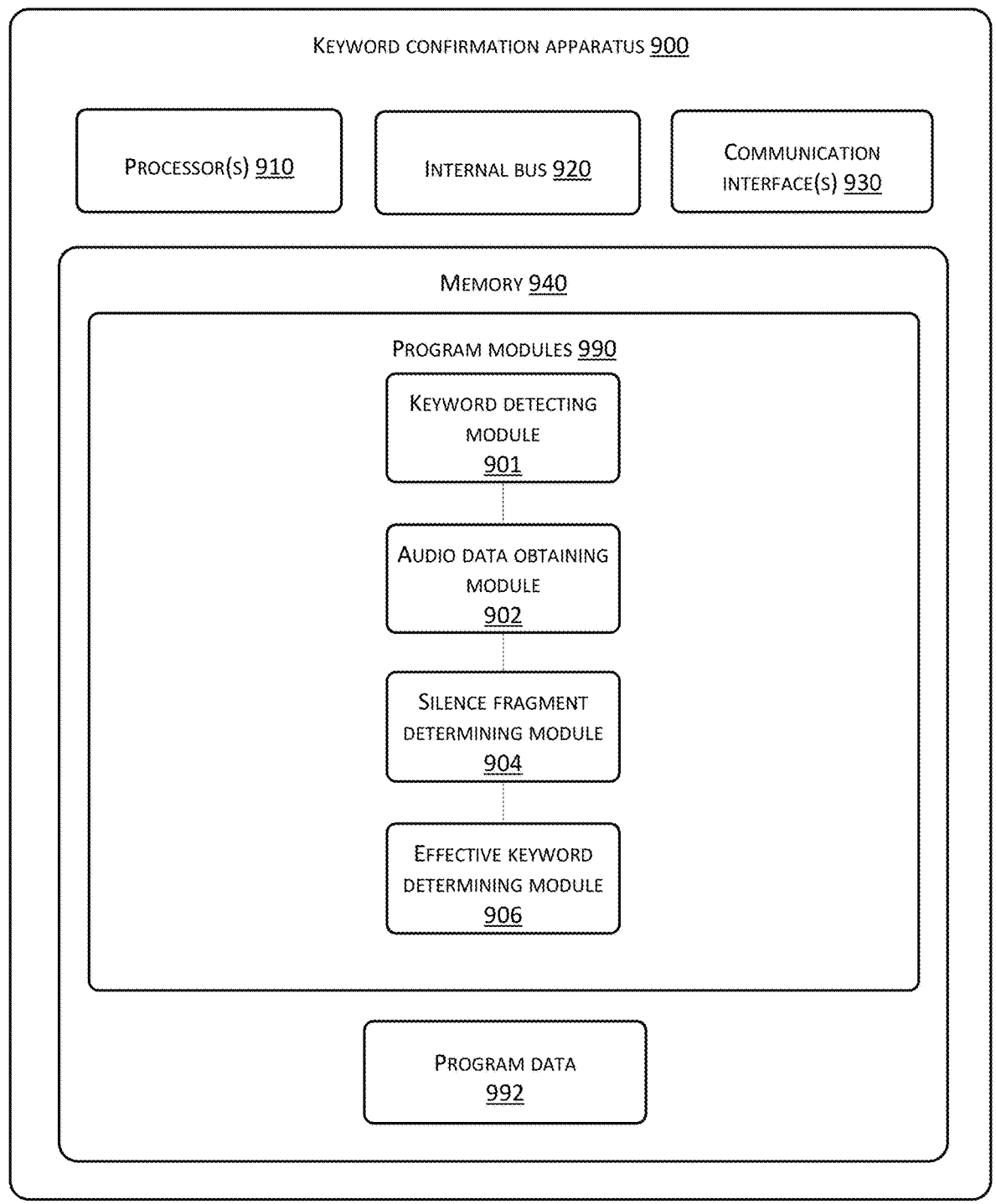
FIG. 9 is a block diagram of a keyword confirmation apparatus according to a seventh example embodiment of the present disclosure.

A sixth example embodiment of the present disclosure sets forth a keyword confirmation apparatus. FIG. 9 is a block diagram of a keyword confirmation apparatus 900 according to a seventh example embodiment of the present disclosure. As illustrated by FIG. 9, the keyword confirmation apparatus 900 of the example embodiment of the present disclosure may include: one or more processors 910, an internal bus 920, one or more communication interfaces 930, and memory 940. The apparatus 900 may further include an audio data obtaining module 902, a silence fragment determining module 904, and an effective keyword determining module 906.

Memory 940 is operative to store program instructions and/or data.

One or more processors 910, through reading program instructions and/or data stored on memory 940, is operative to execute processes as follows:

The audio data obtaining module 902 is stored in the memory 940 and executable by the one or more processors 910 configured to cause the one or more processors 910 to obtain first audio data, the first audio data being recognized as a keyword;

The silence fragment determining module 904 is stored in the memory 940 and executable by the one or more processors 910 configured to cause the one or more processors 910 to determine that multiple contiguous silence fragments exist in second audio data contiguous in time with the first audio data;

The effective keyword determining module 906 is stored in the memory 940 and executable by the one or more processors 910 configured to cause the one or more processors 910 to confirm the first audio data as an effective keyword.

Optionally, the apparatus 900 may further include a keyword detecting module 901.

The keyword detecting module 901 is stored in the memory 940 and executable by the one or more processors 910 configured to cause the one or more processors 910 to, before the audio data obtaining module 902 obtains first audio data, detect whether collected audio data includes a keyword.

Otherwise, the terminal keyword confirmation apparatus set forth by the present example embodiment at least has the following advantages:

According to a keyword confirmation apparatus set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

An embodiment of the present application further discloses a computer readable storage medium, wherein the computer readable storage medium stores instructions which, when running on a computer, enable the computer to perform the processes described above.

The memory 940 may include a form of computer readable media such as a volatile memory, a random access memory (RAM) and/or a non-volatile memory, for example, a read-only memory (ROM) or a flash RAM. The memory 940 is an example of a computer readable media.

In implementations, the memory 940 may include program modules 990 and program data 992. The program modules 992 may include one or more of the modules as described above.

Seventh Example Embodiment

Figure 10:
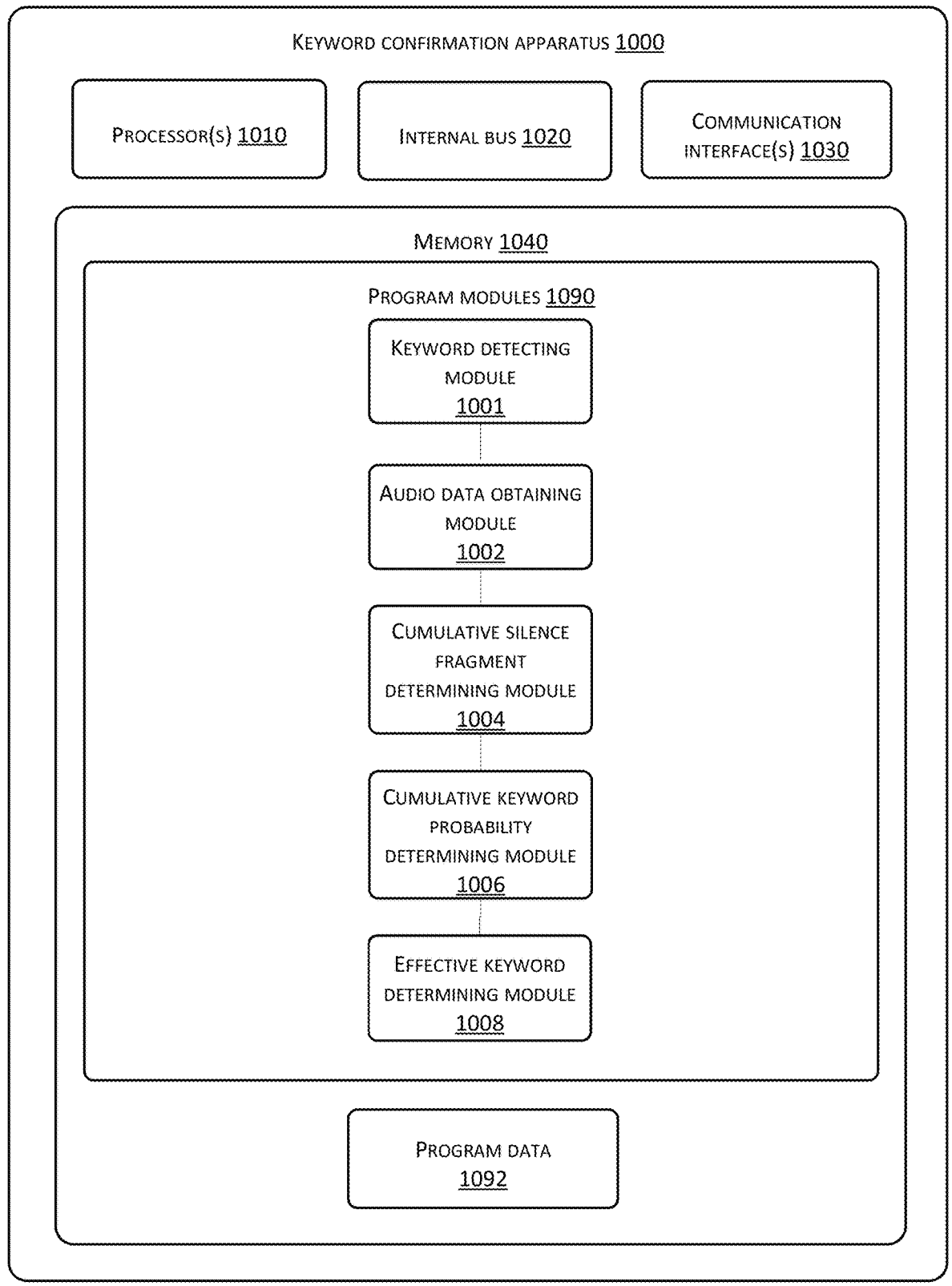
FIG. 10 is a block diagram of a keyword confirmation apparatus according to an eighth example embodiment of the present disclosure.

A seventh example embodiment of the present disclosure sets forth a keyword confirmation apparatus. FIG. 10 is a block diagram of a keyword confirmation apparatus 1000 according to an eighth example embodiment of the present disclosure. As illustrated by FIG. 10, the keyword confirmation apparatus 1000 of the example embodiment of the present disclosure may include: one or more processors 1010, an internal bus 1020, one or more communication interfaces 1030, and memory 1040. The apparatus 1000 may further include an audio data obtaining module 1002, a cumulative silence fragment determining module 1004, a cumulative keyword probability determining module 1006, and an effective keyword determining module 1008.

Memory 1040 is operative to store program instructions and/or data.

One or more processors 1010, through reading program instructions and/or data stored on memory 1040, is operative to execute processes as follows:

An audio data obtaining module 1002 is stored in the memory 940 and executable by the one or more processors 910 configured to cause the one or more processors 910 to obtain first audio data, the first audio data being recognized as a keyword;

A cumulative silence fragment determining module 1004 is stored in the memory 940 and executable by the one or more processors 910 configured to cause the one or more processors 910 to determine a cumulative silence probability of multiple fragments of the second audio data contiguous in time with the first audio data;

A cumulative keyword probability determining module 1006 is stored in the memory 940 and executable by the one or more processors 910 configured to cause the one or more processors 910 to determine a cumulative keyword probability of multiple fragments of the first audio data;

An effective keyword determining module 1008 is stored in the memory 940 and executable by the one or more processors 910 configured to cause the one or more processors 910 to confirm, when a relationship between the cumulative silence probability and the cumulative keyword probability satisfies a second preset condition, the first audio data as an effective keyword.

Optionally, the apparatus 1000 may further include a keyword detecting module 1001.

The keyword detecting module 1001 is stored in the memory 1040 and executable by the one or more processors 1010 configured to cause the one or more processors 1010 to, before the audio data obtaining module 1002 obtains first audio data, detect whether collected audio data includes a keyword.

Otherwise, the terminal keyword confirmation apparatus set forth by the present example embodiment at least has the following advantages:

According to a keyword confirmation apparatus set forth by example embodiments of the present disclosure, utilizing typical habits of a user, that is, that a pause will occur before or after sounding a keyword resulting in silence, through detecting whether silence exists before and after a keyword, whether the keyword is an effective keyword is detected, improving detection accuracy, and avoiding recognition errors. At the same time, with regard to detecting silence, detection utilizing silence fragments of audio data improves accuracy of evaluating whether silence is present, further avoiding misevaluating the keyword as a non-keyword.

The memory 1040 may include a form of computer readable media such as a volatile memory, a random access memory (RAM) and/or a non-volatile memory, for example, a read-only memory (ROM) or a flash RAM.

In implementations, the memory 1040 may include program modules 1090 and program data 1092. The program modules 1092 may include one or more of the modules as described above.

In terms of example embodiments of apparatuses, due to being essentially similar to example embodiments of methods, they are described comparatively simply, and referring to related example embodiments of methods shall suffice for description.

Figure 11:
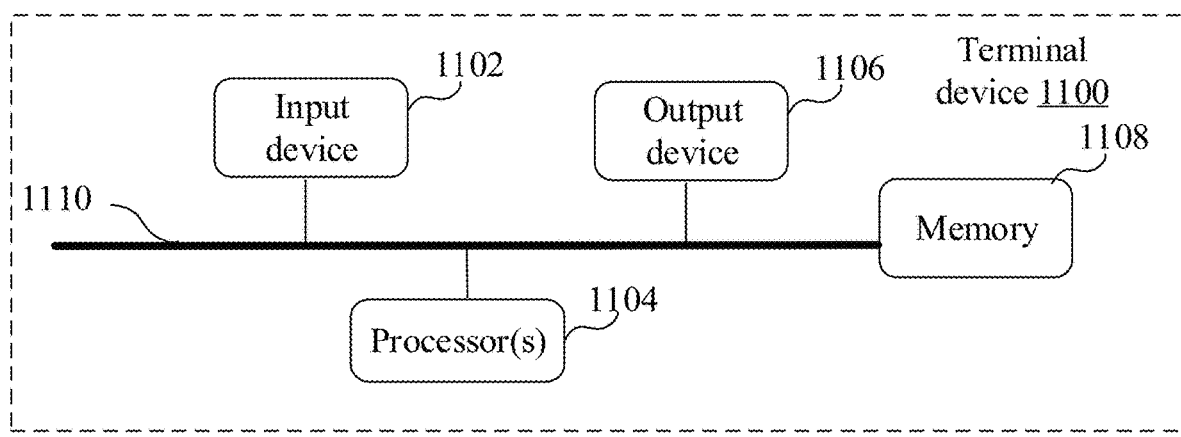
FIG. 11 schematically illustrates a block diagram of a terminal device configured to execute methods based on the present disclosure.

FIG. 11 is a hardware structural diagram of a terminal device 1100 provided by an example embodiment of the present disclosure. As illustrated by FIG. 11, the terminal device 1100 may include an input device 1102, one or more processor(s) 1104, an output device 1106, memory 1108 and at least one communication bus(es) 1110. The communication bus(es) 1110 is/are configured to implement communication connections between elements. The memory 1108 may include high-speed RAM memory, or may include non-volatile storage (NVM), such as at least one disk storage; various programs may be stored on memory 1106, configured to complete various processing functionality as well as implement method steps of the present example embodiment.

Optionally, the above-mentioned processor(s) 1104 may, for example, be implemented by a central processing unit (CPU), an application-specific integrated circuit (ASIC), a digital signal processor (DSP), a digital signal processing device (DSPD), a programmable logic device (PLD), a field-programmable gate array (FPGA), a controller, a microcontroller, a microprocessor or other electronic elements, the processor(s) 1104 being coupled to the above-mentioned input device 1102 and output device 1106 through wired or wireless connections.

Optionally, the above-mentioned input device 1102 may include various input devices; for example, it may include a user-oriented user interface, a device-oriented device interface, a software-programmable interface, a camera, and at least one type of sensor. Optionally, the device-oriented device interface may be a wired interface configured to perform data transmission between devices, or may be a hardware insertion interface configured to perform data transmission between devices (such as a USB port, a serial port and the like). Optionally, the user-oriented user interface may, for example, be a user-oriented control button, a voice input device configured to receive voice input as well as a touch sensing device (such as a touchscreen, touchpad, and the like having touch-sensing functionality) configured to receive user touch input. Optionally, the above-mentioned software-programmable interface may be an entry point for a user to edit or modify a program, such as an input pin interface of a chip or an input interface and the like. A microphone and such audio input devices may receive speech data. Output device 1106 may include a monitor, a stereo, and such output devices.

According to the present example embodiment, the processor of the terminal device is configured to execute the functionalities of each module of data processing apparatuses of each device, the functionalities and technical effects referring to the above-mentioned example embodiments, which shall not be repeated herein.

Figure 12:
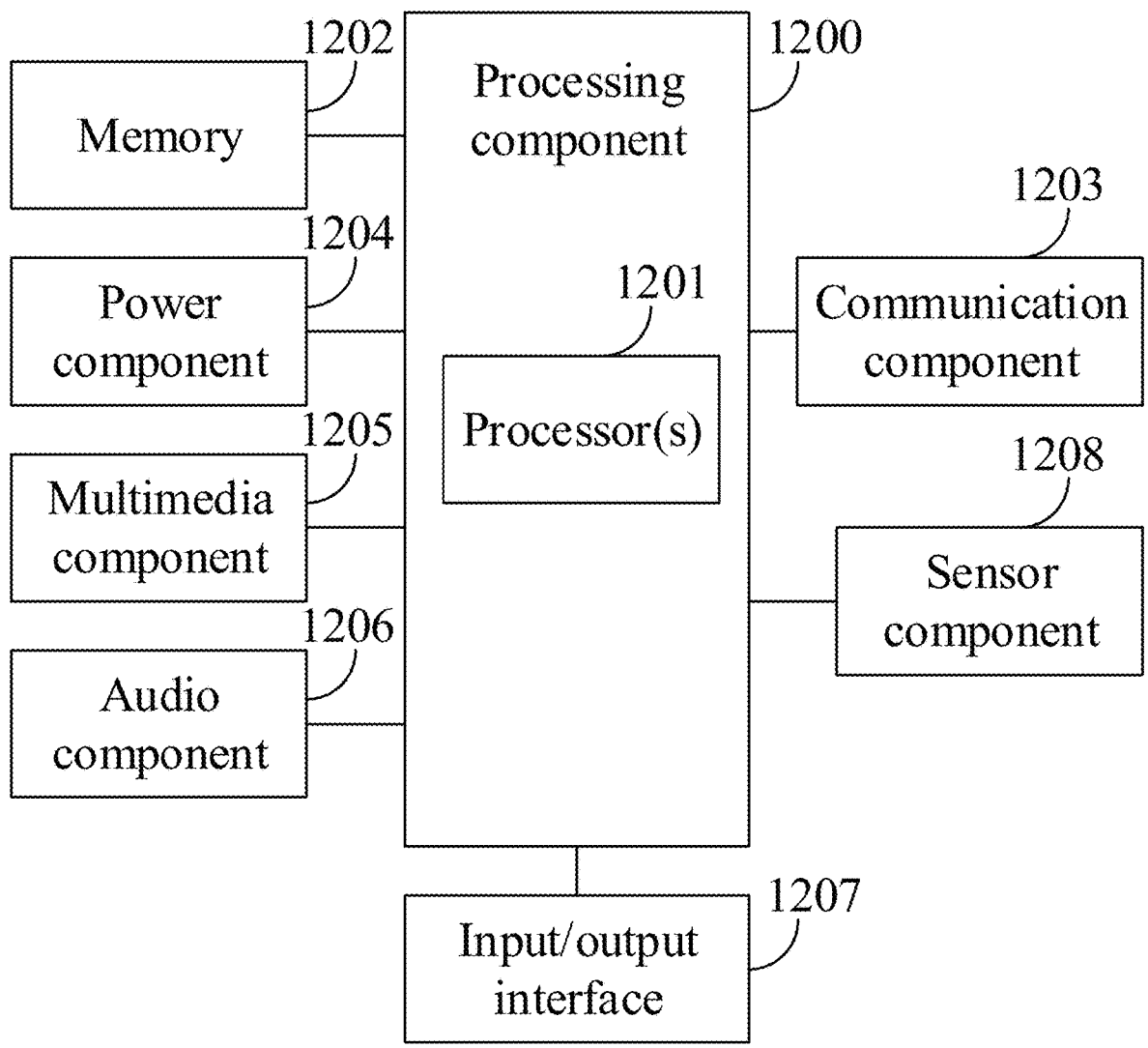
FIG. 12 schematically illustrates storage units configured to maintain or carry program code implementing methods based on the present disclosure.

FIG. 12 is a hardware structural diagram of a terminal device provided by another example embodiment of the present disclosure. FIG. 12 is a particular example embodiment during the implementation procedure of FIG. 11. As illustrated by FIG. 12, a terminal device of the present example embodiment includes one or more processor(s) 1201 and memory 1202.

Processor(s) 1201 executes computer program code stored on memory 1202, implementing methods of FIG. 1 to FIG. 7 of the above-mentioned example embodiments.

Memory 1202 is configured to store various types of data and support the operation of the terminal device. Examples of this data include instructions of any application program or method operated on the terminal device, such as information, images, video, and the like. Memory 1202 may include random access memory (RAM), or may include non-volatile memory, such as at least one disk storage.

Optionally, processor 1201 is set up in a processing component 1200. The terminal device may further include: a communication component 1203, a power component 1204, a multimedia component 1205, an audio component 1206, an input/output interface 1207 and/or a sensor component 1208. Components and the like particularly included in the terminal device are set based on actual requirements, which shall not be limited by the present example embodiment.

The processing component 1200 usually controls the overall operation of the terminal device. The processing component 1200 may include one or more processor(s) 1201 to execute commands, and complete all or some steps of the above-mentioned methods of FIG. 1 to FIG. 7. Additionally, the processing component 1200 may include one or more modules, facilitating interactions between the processing component 1200 and other components. For example, the processing component 1200 may include a multimedia module, facilitating interactions between the multimedia component 1205 and the processing component 1200.

The power component 1204 provides electricity to various components of the terminal device. The power component 1204 may include a power management system, one or more power supplies, and other components related to generating, managing and distributing electricity for the terminal device.

The multimedia component 1205 includes a display providing an output interface between the terminal device and the user. According to some example embodiments, the display may include a liquid crystal display (LCD) and a touch panel (TP). If the display includes a touch panel, the display may be implemented as a touchscreen, receiving input signals of a user. A touch panel includes one or more touch sensors which sense touch, sliding and gestures upon the touch panel. The touch sensors may not only sense boundaries of touch or sliding motions, but also detect sustained times and pressure related to the touch or sliding operations.

The audio component 1206 is configured to output and/or input audio signals. For example, the audio component 1206 includes a microphone; when a mode of operation of the terminal device is a voice recognition mode, the microphone is configured to receive external audio signals. The received audio signals may be further stored on the memory 1202 or sent via the communication component 1203. According to some example embodiments, the audio component 1206 further includes a speaker, configured to output audio signals.

The input/output interface 1207 provides an interface between the processing component 1200 and a peripheral interface module, where the peripheral interface module may be a click wheel, a button and the like. Such buttons may include, without limitation: a volume button, a start button and a lock button.

The sensor component 1208 includes one or more sensors, configured to provide state assessment of various aspects for the terminal device. For example, the sensor component 1208 may detect an on/off state of the terminal device, relative positioning of components, and whether contact exists or not between a user and the terminal device. The sensor component 1208 may include a proximity sensor, configured to detect the existence of nearby objects while there is no physical contact, including detecting a distance between a user and the terminal device. According to some example embodiments, the sensor component 1208 may further include a camera and the like.

The communication component 1203 is configured to cause communication by a wired or a wireless fashion between the terminal device and other devices. The terminal device may access a wireless network based on communication protocols, such as Wi-Fi, 2G or 3G, or a combination thereof. According to an example embodiment, the terminal device may include a SIM card slot, the SIM card slot being configured for inserting a SIM card, enabling the terminal device to log on to a GPRS network, establishing communication with a server through the Internet.

By the above it may be known that the communication component 1203, the audio component 106, the input/output interface 1207, and the sensor component 1208 according to the example embodiment of FIG. 12 may serve as manners of implementing the input device according to the example embodiment of FIG. 11.

Example embodiment of the present disclosure provide a terminal device, including: one or more processors; and one or more machine-readable storage media storing instructions which, upon execution by the one or more processors, cause the terminal device to execute one or more of the methods according to example embodiments of the present disclosure.

According to an example embodiment, the above-mentioned terminal device may include an in-vehicle terminal, a mobile terminal (such as a mobile phone, a tablet computer, a personal digital assistant and the like), a server, an Internet of Things device or a smart appliance and such various smart terminal devices having computational, processing functionality. Smart appliances include, for example, microwaves, ovens, washing machines, dishwashers, air conditioners, routers, smart speakers, televisions, refrigerators, vacuum cleaners and the like. An above-mentioned smart terminal device may have application programs installed, providing a human interaction operation interface, and executing keyword confirmation methods of each aforementioned example embodiment.

For example, these smart terminal devices may, through an internal or external audio receiving component, receive audio data, and after confirming a second audio data before or after the first audio data as silence, confirm the first audio data as an effective keyword. For example, with regard to a mobile phone, by this manner whether a voice command sounded by a user is for instructing an application program installed on the mobile phone to execute a corresponding operational instruction—such as starting music, navigation and the like. With regard to an Internet of Things device or a smart appliance, by this manner whether a voice command sounded by a user is for instructing software or a system installed therein to execute a corresponding operational instruction—such as connecting other devices, increasing air conditioner temperature, starting a high temperature baking mode of an oven and the like. No particular restrictions are imposed herein. Thereby, by the above-mentioned example descriptions it may be known that various types of terminal devices may be utilized in the present disclosure.

Memory of the above-mentioned example embodiments is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Each example embodiment according to the present disclosure is described employing a progressive fashion, with each example embodiment emphasizing the description of its differences from other example embodiments, and reference to each other for same or similar parts among each example embodiment shall suffice.

Although preferred example embodiments of example embodiments of the present disclosure have been described, persons skilled in the art, upon learning the creative concepts herein, may make other changes and modifications to these example embodiments. Therefore, the claims herein should be understood as including the preferred example embodiments as well as all changes and modifications falling within the scope of example embodiments of the present disclosure.

Finally, it should be stated that within the present disclosure, relational terminology of the type such as "first" and "second" and the like is merely utilized to differentiate one entity or operation from another entity or operation, not necessarily requiring or suggesting that any such actual relationships or orderings exist between these entities or operations. Moreover, the terms "including," "containing," "comprising," or any other variation shall encompass non-exclusive comprising, and therefore a process, method, article or terminal device including a series of elements does not merely include those elements, but further include other elements not expressly listed, or further include inherent elements of those respective processes, methods, articles or terminal devices. In the absence of further limitation, an element limited by the statement "including a . . . " shall not exclude a process, method, article or terminal device including the element from having other same elements therein.

The above disclosure provides keyword confirmation methods and apparatuses, introduced in detail. The present disclosure utilizes particular examples to explain principles and implementation methods of the present disclosure, and the descriptions of above example embodiments are merely to assist in understanding methods and core ideas of the present disclosure; at the same time, persons of ordinary skill in the art, in accordance with ideas of the present disclosure, will be capable of modifications within the scope of methods and applications of the present example embodiments, and otherwise the contents herein shall not be understood as limiting the present disclosure.

The present disclosure may further be understood with clauses as follows.

Clause 1. A keyword confirmation method, comprising:
obtaining first audio data, the first audio data being recognized as a keyword;
determining that multiple contiguous silence fragments exist in second audio data contiguous in time with the first audio data; and
confirming the first audio data as an effective keyword.

Clause 2. The method of clause 1, wherein the step of determining that multiple contiguous silence fragments exist in second audio data contiguous in time with the first audio data comprises:
determining a pronunciation similarity probability of the fragments, the pronunciation similarity probability being the largest similarity probability of the fragments among multiple pronunciation units;
determining a silence probability of the fragments, the silence probability being a similarity probability between the fragments and silence units;
when a relationship between the pronunciation similarity probability and the silence probability satisfies a preset condition, determining the fragments as silence fragments; and
based on the determined silence fragments, determining that the second audio data has multiple contiguous silence fragments therein.

Clause 3. The method of clause 1, wherein the step of determining that multiple contiguous silence fragments exist in second audio data contiguous in time with the first audio data comprises:
determining a pronunciation similarity probability of the fragments, the pronunciation similarity probability being the largest similarity probability of the fragments among multiple pronunciation units;
determining a silence probability of the fragments, the silence probability being a similarity probability between pronunciation units and silence units corresponding to the largest similarity probability;
when a relationship between the pronunciation similarity probability and the silence probability satisfies a preset condition, determining the fragments as silence fragments; and
based on the determined silence fragments, determining that the second audio data has multiple contiguous silence fragments therein.

Clause 4. The method of one of the clauses 2 or 3, wherein the step of, based on the determined silence fragments, determining that the second audio data has multiple contiguous silence fragments therein comprises:
determining that the second audio data has more than three contiguous silence fragments therein.

Clause 5. The method of one of the clauses 2 or 3, wherein the preset condition comprises:
absolute value of a difference between the pronunciation similarity probability and the silence probability being less than a first threshold.

Clause 6. The method of clause 1, further comprising, before the step of obtaining audio data:
detecting whether collected audio data includes a keyword.

Clause 7. The method of clause 6, wherein the keyword has attribute information, and the step of confirming the first audio data as an effective keyword comprises:
when attribute information of the keyword is a primary keyword, and second audio data before the keyword is silence, confirming the keyword as an effective primary keyword.

Clause 8. The method of clause 6, wherein the keyword has attribute information, and the step of confirming the first audio data as an effective keyword comprises:
when attribute information of the keyword is a secondary keyword, and second audio data before and after the keyword is silence, confirming the keyword as an effective secondary keyword.

Clause 9. A keyword confirmation method, comprising:
obtaining first audio data, the first audio data being recognized as a keyword;
determining a cumulative silence probability of multiple fragments of the second audio data contiguous in time with the first audio data;
determining a cumulative keyword probability of multiple fragments of the first audio data; and
when a relationship between the cumulative silence probability and the cumulative keyword probability satisfies a second preset condition, confirming the first audio data as an effective keyword.

Clause 10. The method of clause 9, wherein the second preset condition comprises:
a ratio of the cumulative silence probability and the cumulative keyword probability being greater than a second threshold.

Clause 11. The method of clause 9, further comprising, before the step of obtaining audio data:

detecting whether collected audio data includes a keyword.

Clause 12. The method of clause 11, wherein the keyword has attribute information, and when a relationship between the cumulative silence probability and the cumulative keyword probability satisfies the second preset condition, the step of confirming the first audio data as an effective keyword comprises:

when attribute information of the keyword is a primary keyword, and second audio data before the keyword is silence, confirming the keyword as an effective primary keyword.

Clause 13. The method of clause 11, wherein the keyword has attribute information, and when a relationship between the cumulative silence probability and the cumulative keyword probability satisfies the second preset condition, the step of confirming the first audio data as an effective keyword comprises:

when attribute information of the keyword is a secondary keyword, and second audio data before and after the keyword is silence, confirming the keyword as an effective secondary keyword.

Clause 14. An in-vehicle terminal keyword confirmation method, comprising:

obtaining first audio data through an in-vehicle sound collection apparatus, the first audio data being recognized as a keyword;

determining that multiple contiguous silence fragments exist in second audio data contiguous in time with the first audio data; and confirming the first audio data as an effective keyword, wherein the effective keyword is operative to wake an in-vehicle terminal to execute an instruction corresponding to the keyword.

Clause 15. An in-vehicle terminal keyword confirmation method, comprising:

obtaining first audio data through an in-vehicle sound collection apparatus, the first audio data being recognized as a keyword;

determining a cumulative silence probability of multiple fragments of the second audio data contiguous in time with the first audio data;

determining a cumulative keyword probability of multiple fragments of the first audio data; and when a relationship between the cumulative silence probability and the cumulative keyword probability satisfies a second preset condition, confirming the first audio data as an effective keyword, wherein the effective keyword is operative to wake an in-vehicle terminal to execute an instruction corresponding to the keyword.

Clause 16. A keyword confirmation apparatus, comprising:

an audio data obtaining module, configured to obtain first audio data, the first audio data being recognized as a keyword;

a silence fragment determining module, configured to determine that multiple contiguous silence fragments exist in second audio data contiguous in time with the first audio data; and an effective keyword determining module, configured to confirm the first audio data as an effective keyword.

Clause 17. A keyword confirmation apparatus, comprising:

an audio data obtaining module, configured to obtain first audio data, the first audio data being recognized as a keyword;

a cumulative silence fragment determining module, configured to determine a cumulative silence probability of multiple fragments of the second audio data contiguous in time with the first audio data;

a cumulative keyword probability determining module, configured to determine a cumulative keyword probability of multiple fragments of the first audio data; and an effective keyword determining module, configured to confirm, when a relationship between the cumulative silence probability and the cumulative keyword probability satisfies a second preset condition, the first audio data as an effective keyword.

Clause 18. A terminal device, comprising:

one or more processors; and one or more machine-readable storage media storing instructions which, upon execution by the one or more processors, cause the terminal device to execute one or more of the methods according to one of the clauses 1-15.

Clause 19. The terminal device of clause 18, wherein the terminal device comprises an in-vehicle terminal, a mobile terminal, a server, an Internet of Things device or a smart appliance.

Clause 20. One or more machine-readable storage media storing instructions which, upon execution by one or more processors, cause a terminal device to execute one or more of the methods according to one of the clauses 1-15.

What is claimed is:

1. A method implemented by a computing device having one or more processors and a memory, the method comprising:

obtaining first audio data via a microphone, the first audio data being recognized as a keyword;

determining, by the one or more processors and based on silent units pre-stored in a database, that multiple contiguous silence fragments exist in second audio data contiguous in time with the first audio data, including;

partitioning the second audio data into a plurality of fragments, determining a pronunciation similarity probability of individual fragment, the pronunciation similarity probability being a largest similarity probability among pronunciation units, determining a silence probability for individual fragment, the silence probability being a similarity probability between the pronunciation units and the silence units corresponding to a largest similarity probability, and determining that the individual fragment is a silence fragment upon determining that a relationship between the pronunciation similarity probability and the silence probability of the individual fragment satisfies a preset condition; and confirming, by the one or more processors, the first audio data as an effective keyword, wherein the silent units are obtained by iteratively training a model using training data.

2. The method of claim 1, wherein the step of determining, by the one or more processors, that multiple contiguous silence fragments exist in second audio data contiguous in time with the first audio data comprises:

determining a pronunciation similarity probability of the fragments, the pronunciation similarity probability being the largest similarity probability of the fragments among multiple pronunciation units;

determining a silence probability of the fragments, the silence probability being a similarity probability between the fragments and silence units;

determining the fragments as silence fragments upon determining that a relationship between the pronunciation similarity probability and the silence probability satisfies a preset condition; and determining, based on the determined silence fragments, that the second audio data has multiple contiguous silence fragments therein.

3. The method of claim 2, wherein the step of determining, based on the determined silence fragments, that the second audio data has multiple contiguous silence fragments therein comprises:

determining that the second audio data has more than three contiguous silence fragments therein.

4. The method of claim 2, wherein the preset condition comprises:

absolute value of a difference between the pronunciation similarity probability and the silence probability being less than a first threshold.

5. The method of claim 1, further comprising, before the step of obtaining the first audio data:

detecting, by the one or more processors, whether collected audio data includes a keyword, the first audio data being obtained from collected audio data determined as including a keyword.

6. The method of claim 5, wherein the keyword has attribute information, and the step of confirming the first audio data as an effective keyword comprises:

confirming the keyword as an effective primary keyword upon determining that attribute information of the keyword is a primary keyword and that second audio data before the keyword is silence.

7. The method of claim 5, wherein the keyword has attribute information, and the step of confirming the first audio data as an effective keyword comprises:

confirming the keyword as an effective secondary keyword upon determining that attribute information of the keyword is a secondary keyword and that second audio data before and after the keyword is silence.

8. A method implemented by a computing device having one or more processors and a memory, the method comprising:

obtaining first audio data via a microphone, the first audio data being recognized as a keyword;

determining, by the one or more processors and based on silent units pre-stored in a database, a cumulative silence probability of multiple fragments of second audio data contiguous in time with the first audio data, including:

determining a pronunciation similarity probability of individual fragment of the multiple fragments based on pronunciation units, determining a silence probability for individual fragment, the silence probability being a similarity probability between the pronunciation units and the silence units corresponding to a largest similarity probability, and determining the cumulative silence probability of the multiple fragments based on the silence probability for the individual fragment;

determining, by the one or more processors, a cumulative keyword probability of multiple fragments of the first audio data; and confirming, by the one or more processors, the first audio data as an effective keyword upon determining that a relationship between the cumulative silence probability and the cumulative keyword probability satisfies a second preset condition, wherein the silent units are obtained by iteratively training a model using training data.

9. The method of claim 8, wherein the second preset condition comprises:

a ratio of the cumulative silence probability and the cumulative keyword probability being greater than a second threshold.

10. The method of claim 8, further comprising, before the step of obtaining the first audio data:

detecting, by the one or more processors, whether collected audio data includes a keyword, the first audio data being obtained from collected audio data determined as including a keyword.

11. The method of claim 10, wherein the keyword has attribute information, and the step of confirming the first audio data as an effective keyword upon determining that a relationship between the cumulative silence probability and the cumulative keyword probability satisfies the second preset condition comprises:

confirming the keyword as an effective primary keyword upon determining that attribute information of the keyword is a primary keyword and that second audio data before the keyword is silence.

12. The method of claim 10, wherein the keyword has attribute information, and the step of confirming the first audio data as an effective keyword upon determining that a relationship between the cumulative silence probability and the cumulative keyword probability satisfies the second preset condition comprises:

confirming the keyword as an effective secondary keyword upon determining that attribute information of the keyword is a secondary keyword and that second audio data before and after the keyword is silence.

13. An apparatus comprising:

one or more processors;

memory;

an audio data obtaining module stored in the memory and executable by the one or more processors configured to cause the one or more processors to obtain first audio data, the first audio data being recognized as a keyword;

a silence fragment determining module stored in the memory and executable by the one or more processors configured to cause the one or more processors to determine that multiple contiguous silence fragments exist in second audio data contiguous in time with the first audio data, including:

partitioning the second audio data into a plurality of fragments, determining a pronunciation similarity probability of individual fragment, the pronunciation similarity probability being a largest similarity probability among pronunciation units, determining a silence probability for individual fragment, the silence probability being a similarity probability between the pronunciation units and the silence units corresponding to a largest similarity probability, and determining that the individual fragment is a silence fragment upon determining that a relationship between the pronunciation similarity probability and the silence probability of the individual fragment satisfies a preset condition; and an effective keyword determining module stored in the memory and executable by the one or more processors configured to cause the one or more processors to confirm the first audio data as an effective keyword, wherein the silent units are obtained by iteratively training a model using training data.

14. The apparatus of claim 13, the silence fragment determining module further being executable by the one or more processors configured to cause the one or more processors to:
   determine a pronunciation similarity probability of the fragments, the pronunciation similarity probability being the largest similarity probability of the fragments among multiple pronunciation units;
   determine a silence probability of the fragments, the silence probability being a similarity probability between the fragments and silence units;
   determine the fragments as silence fragments upon determining that a relationship between the pronunciation similarity probability and the silence probability satisfies a preset condition; and
   determine, based on the determined silence fragments, that the second audio data has multiple contiguous silence fragments therein.

15. The apparatus of claim 14, the silence fragment determining module further being executable by the one or more processors configured to cause the one or more processors to:
   determine that the second audio data has more than three contiguous silence fragments therein.

16. The apparatus of claim 13, the silence fragment determining module further being executable by the one or more processors configured to cause the one or more processors to:
   determine a pronunciation similarity probability of the fragments, the pronunciation similarity probability being the largest similarity probability of the fragments among multiple pronunciation units;
   determine a silence probability of the fragments, the silence probability being a similarity probability between pronunciation units and silence units corresponding to the largest similarity probability;
   determine the fragments as silence fragments upon determining that a relationship between the pronunciation similarity probability and the silence probability satisfies a preset condition; and
   determine, based on the determined silence fragments, that the second audio data has multiple contiguous silence fragments therein.

17. The apparatus of claim 13, further comprising a keyword detecting module stored in the memory and executable by the one or more processors configured to cause the one or more processors to, before the audio data obtaining module obtains first audio data, detect whether collected audio data includes a keyword, the first audio data being obtained from collected audio data determined as including a keyword.

18. The apparatus of claim 17, wherein the keyword has attribute information, and the keyword detecting module further being executable by the one or more processors configured to cause the one or more processors to:
   confirm the keyword as an effective primary keyword upon determining that attribute information of the keyword is a primary keyword and that second audio data before the keyword is silence.

19. The apparatus of claim 17, wherein the keyword has attribute information, and the keyword detecting module further being executable by the one or more processors configured to cause the one or more processors to:
   confirm the keyword as an effective secondary keyword upon determining that attribute information of the keyword is a secondary keyword and that second audio data before and after the keyword is silence.

* * * * *